US011831591B2

(12) United States Patent
Kim

(10) Patent No.: US 11,831,591 B2
(45) Date of Patent: Nov. 28, 2023

(54) GRID SHAPED SUB SCREEN FOR RECEIVING EMAIL ADDRESSEE INPUT

(71) Applicant: Tae Moon Kim, Arlington, VA (US)

(72) Inventor: Tae Moon Kim, Arlington, VA (US)

( * ) Notice: Subject to any disclaimer, the term of this patent is extended or adjusted under 35 U.S.C. 154(b) by 0 days.

(21) Appl. No.: 17/932,272

(22) Filed: Sep. 14, 2022

(65) Prior Publication Data

US 2023/0084879 A1 Mar. 16, 2023

(30) Foreign Application Priority Data

Sep. 15, 2021 (KR) ......................... 10-2021-0123277

(51) Int. Cl.
*G06F 15/16* (2006.01)
*H04L 51/07* (2022.01)
*H04L 51/48* (2022.01)
*H04L 51/21* (2022.01)

(52) U.S. Cl.
CPC .............. *H04L 51/07* (2022.05); *H04L 51/21* (2022.05); *H04L 51/48* (2022.05)

(58) Field of Classification Search
CPC .......... H04L 51/07; H04L 51/21; H04L 51/48
USPC ........................................................ 709/206
See application file for complete search history.

(56) References Cited

U.S. PATENT DOCUMENTS

| 5,923,848 | A * | 7/1999 | Goodhand | ........... | G06Q 10/107 |
| | | | | | 709/219 |
| 6,175,833 | B1 * | 1/2001 | West | ...................... | G07C 13/00 |
| | | | | | 434/323 |
| 6,212,553 | B1 * | 4/2001 | Lee | ...................... | G06Q 10/107 |
| | | | | | 709/219 |
| 6,549,950 | B2 * | 4/2003 | Lytle | ...................... | H04L 51/48 |
| | | | | | 709/204 |
| 6,993,563 | B2 * | 1/2006 | Lytle | ...................... | H04L 51/48 |
| | | | | | 709/202 |
| 7,010,616 | B2 * | 3/2006 | Carlson | ................ | G06Q 10/107 |
| | | | | | 709/201 |

(Continued)

FOREIGN PATENT DOCUMENTS

| KR | 1020000059118 A | 10/2000 |
| KR | 1020020015880 A | 3/2002 |

(Continued)

OTHER PUBLICATIONS

First Office Action dated Oct. 18, 2021 issued in Korean Application No. 10-2021-0123277.

(Continued)

*Primary Examiner* — Alicia Baturay
(74) *Attorney, Agent, or Firm* — Cybernetic Law PLLC; John Hocker

(57) ABSTRACT

Systems and methods including, in response to receiving the indication of the user interaction with the status update link: accessing email addressee graphical user interface (GUI) information; and transmitting, over the network, the email addressee response GUI information; receiving response information; identifying whether the user input is a first response type or a second response type; when the user input is the first response type, updating a first value; when the user input is the second response type, updating a second value; and displaying the first value and the second value.

20 Claims, 18 Drawing Sheets

(56) References Cited

U.S. PATENT DOCUMENTS

| | | | | |
|---|---|---|---|---|
| 7,523,222 B2* | 4/2009 | Carlson | H04L 51/48 | |
| | | | 709/201 | |
| 7,757,270 B2* | 7/2010 | Blumenau | G06F 21/10 | |
| | | | 726/1 | |
| 7,836,132 B2* | 11/2010 | Qureshi | H04L 51/23 | |
| | | | 709/206 | |
| 8,140,375 B2* | 3/2012 | Parnell | G06Q 30/0201 | |
| | | | 705/7.29 | |
| 8,224,924 B2* | 7/2012 | Andersen | G06Q 10/10 | |
| | | | 709/224 | |
| 9,253,615 B2* | 2/2016 | Ickman | G06Q 10/1095 | |
| 9,264,462 B2 | 2/2016 | Heiferman et al. | | |
| 9,432,826 B2* | 8/2016 | Ickman | G06Q 50/01 | |
| 10,796,285 B2* | 10/2020 | Johnson | G06Q 10/06314 | |
| 10,803,424 B2* | 10/2020 | Gray | G06Q 10/1095 | |
| 10,872,486 B2* | 12/2020 | Soni | G06Q 30/0201 | |
| 10,951,569 B2* | 3/2021 | Teplow | G06F 3/14 | |
| 11,082,371 B2* | 8/2021 | Gray | H04L 51/046 | |
| 11,190,559 B1 | 11/2021 | Narayanaswamy | | |
| 2007/0112784 A1* | 5/2007 | Blumenau | G06F 21/6218 | |
| 2009/0006111 A1* | 1/2009 | Shahine | G06Q 10/06 | |
| | | | 705/12 | |
| 2016/0005057 A1* | 1/2016 | Zavala | G06Q 30/0203 | |
| | | | 705/7.32 | |

FOREIGN PATENT DOCUMENTS

| | | |
|---|---|---|
| KR | 100613072 B1 | 8/2006 |
| KR | 1020140125672 A | 10/2014 |

OTHER PUBLICATIONS

Second Office Action dated Jan. 4, 2022 issued in Korean Application No. 10-2021-0123277.

* cited by examiner

Sub: Birdie Golf Wait List (First Four Players for Golf Booking on 05/21/23 at 10:30 AM EST)

From: Jane Doe
To: John Doe 1; John Doe 2; John Doe 3...

Birdie Golf: Waitlist (First 4 Players) on 05/21 10:30 am

| | Yes | Waiting | No | Undecided | Reply Time | No Ans |
|---|---|---|---|---|---|---|
| John Doe 5 | Y | | | | 04/11 09:20 | |
| John Doe 10 | Y | | | | 04/11 12:25 | |
| John Doe 6 | Y | | | | 04/12 06:30 | |
| John Doe 9 | Y | | | | 04/14 10:45 | |
| John Doe 3 | | W | | | 04/14 11:20 | |
| John Doe 7 | | W | N | | 04/15 08:35 | |
| John Doe 2 | | | N | | 04/12 15:30 | |
| John Doe 8 | | | | | 04/14 18:45 | |
| John Doe 1 | | | | U | 04/13 14:20 | |
| TOTAL 10 | 4 | 2 | 2 | 1 | | |
| John Doe 4 | | | | | | |

GRID SHAPED SUB SCREEN FOR RECEIVING EMAIL ADDRESSEE INPUT

CROSS-REFERENCE TO RELATED APPLICATIONS

This application is based on and claims the benefit of priority from Korean Patent Application No. 10-2021-0123277, filed on Sep. 15, 2021, in the Korean Intellectual Property Office, the entire disclosure of which is incorporated herein by reference in its entirety.

BACKGROUND

1. Field

Embodiments relate generally to email applications, systems, and methods, and more particularly are directed to email response tracking.

2. Related Art

Patent Literature 1 (U.S. Pat. No. 9,264,462 B2, issued Feb. 16, 2016), the entire disclosure of which is incorporated herein by reference.

3. Description of the Related Art

Various methods have been proposed for replying to Internet communications, such as emails. For example, Patent Literature 1 discloses a system, and method for confirming attendance for in-person meetings or events. However, Patent Literature 1 notes "the individual may not be allowed to RSVP for an event before becoming a member, where RSVP may be one of a plurality of ways a user may indicate their interest in attending a meeting group event. Further, Patent Literature 1 requires a non-member who wishes to join the meeting group be required to supply personal information, such as their name, nickname, email address, reason for joining, address, age, photo, caption for their photo, current activity level in other meeting groups, the current activity level within the interests of the group they are joining, and the like." In addition, Patent Literature 1 teaches "the non-member applicant may be required to choose a password for access to the meeting group's homepage as a member."

That is, Patent Literature 1 teaches a burdensome method of capturing and/or tracking reply/response information, and does not disclose a user friendly method for email users to capture/track reply/response information from a group, such as a group of email addressees. Thus, for these reasons, there is a need for improvements to graphical user interface (GUI)/user experience (UX) systems and methods. There are other shortcomings of the methods in the related art, as discussed below.

The above information is presented as background information only to assist with an understanding of the disclosure. No determination has been made, and no assertion is made, as to whether any of the above might be applicable as prior art regarding the disclosure.

SUMMARY

Aspects of the disclosure are to address at least the above-mentioned and below-mentioned problems and/or disadvantages and to provide at least the advantages described below.

As discussed above, there is a need for improvements to UI/UX systems and methods for capturing, tracking and/or displaying reply/response information via faster, more efficient display methods and UI/UX. Such methods and interfaces may complement or replace conventional methods for capturing, tracking and/or displaying reply/response information. Such methods and interfaces reduce the cognitive burden on a user and produce a more efficient human-machine interface. For battery-operated devices, such methods and interfaces conserve power and increase the time between battery charges by providing a more efficient human-machine interface.

According to various embodiments, the present disclosure provides features and components to increase user friendliness/ease of use of methods for capturing, tracking and/or displaying reply/response information.

Accordingly, an aspect of the disclosure is to provide a responsive server system method performed by one or more hardware servers. The responsive server method comprising: receiving, from a sending electronic terminal device, an email addressed to at least one email addressee; in response to receiving the email from the sending electronic terminal device: accessing a status update link stored in a database of the one or more hardware servers; generating an augmented email having the status update link included with the received email; and transmitting, over the network, the generated augmented email having the status update link to respective electronic devices of each of the at least one email addressee; receiving an indication of a user interaction with the status update link; in response to receiving the indication of the user interaction with the status update link: accessing email addressee graphical user interface (GUI) information; and transmitting, over the network, the email addressee response GUI information; receiving response information submitted in the email addressee response GUI: in response to receiving the response information submitted in the email addressee response GUI: storing the response information in the database in association with the email addressee; identifying whether the user input is a first response type or a second response type; when the user input is the first response type, updating a first value; and when the user input is the second response type, updating a second value; receiving a user interaction by an original sender associated with the sending device: and in response to receiving the user interaction by the original sender: displaying the first value and the second value.

The displaying the first value and the second value includes displaying a response results GUI in the grip shape format with the first value and the second value, according to embodiments. The response results GUI displays an indication of response status of each addressee that has responded, and each of the first value and the second value correspond to a summarization of the first response type and the second response type, respectively.

The summarization of the responses includes a total number of the respective response types or an average value of the responses. The email addressee response GUI is in a two-dimensional grid shaped format. The email addressee response GUI includes the first value and the second value in the two-dimensional grid shaped format. The accessing of the email addressee response GUI information includes: identifying an email addressee of the email; and generating the email addressee response GUI information where the email addressee response GUI displays one or more editable user input fields in the two-dimensional grid shaped format on a row corresponding to the particular email addressee.

The email addressee response GUI is configured to receive user input by the addressee of the email message only. The email message is a meeting, appointment, or event invitation. The one or more hardware servers includes an email server and an email addressee tracking server, and the responsive server system method further comprises: in response to receiving the email from the sending electronic terminal device: transmitting, by the email server, the email to the email addressee tracking server; accessing, by the email addressee tracking server, a status update link stored in a database of the email addressee tracking server; generating, by the email addressee tracking server, the augmented email having the status update link included with the received email; transmitting, by the email addressee tracking server to the email server, the generated augmented email having the status update link; and transmitting, over the network by the email server, the augmented email having the status update link to respective electronic devices of each addressee of the received email.

The user interaction corresponds to selecting, tapping, or clicking a status update button displayed by the email addressee response GUI, or another user interaction such as voice input or gesture input. The status button corresponds to a hyperlinked Uniform Resource Locator (URL).

The first value and the second value are updated by adding, subtracting, accumulating, or averaging. The email addressee response GUI is configured to receive input by the addressee of the email message.

The first value is a first accumulated value that corresponds to a first type of response of one of: "Yes", "Wait", "No", or "Undecided", or "No Answer", the second value is a second accumulated value that corresponds to a second type of response of a different one of: "Yes", "Wait", "No", or "Undecided", or "No Answer", and the first type or response and the second type of response correspond a response to a meeting or appointment request, and the first type of response is different from the second type of response.

The email addressee response GUI may automatically update from a wait status to a yes status for an email addressee, when a different email addressee changes a yes status to a different status.

The responsive server system method may further comprise exporting the reply data table data into a spreadsheet form that is compatible with a spreadsheet application.

The email addressee response GUI includes timestamp information corresponding to when a specific response was entered.

According to an embodiment, a responsive server system comprises: a memory; and processing circuitry, wherein the processing circuitry is configured to executed computer-executable instructions stored in the memory to perform the following operations: receiving, from a sending electronic terminal device, an email addressed to at least one email addressee; in response to receiving the email from the sending electronic terminal device: accessing a status update link stored in a database of the one or more hardware servers; generating an augmented email having the status update link included with the received email; and transmitting, over the network, the generated augmented email having the status update link to respective electronic devices of each of the at least one email addressee; receiving an indication of a user interaction with the status update link; in response to receiving the indication of the user interaction with the status update link: accessing email addressee graphical user interface (GUI) information; and transmitting, over the network, the email addressee response GUI information; receiving response information submitted in the email addressee response GUI: in response to receiving the response information submitted in the email addressee response GUI: storing the response information in the database in association with the email addressee; identifying whether the user input is a first response type or a second response type; when the user input is the first response type, updating a first value; and when the user input is the second response type, updating a second value; receiving a user interaction by an original sender associated with the sending device: and in response to receiving the user interaction by the original sender: displaying the first value and the second value.

According to an embodiment, a non-transitory computer-readable medium comprising computer-executable instructions that, when executed by processing circuitry, cause the processing circuity to perform the following operations: receiving, from a sending electronic terminal device, an email addressed to at least one email addressee; in response to receiving the email from the sending electronic terminal device: accessing a status update link stored in a database of the one or more hardware servers; generating an augmented email having the status update link included with the received email; and transmitting, over the network, the generated augmented email having the status update link to respective electronic devices of each of the at least one email addressee; receiving an indication of a user interaction with the status update link; in response to receiving the indication of the user interaction with the status update link: accessing email addressee graphical user interface (GUI) information; and transmitting, over the network, the email addressee response GUI information; receiving response information submitted in the email addressee response GUI: in response to receiving the response information submitted in the email addressee response GUI: storing the response information in the database in association with the email addressee; identifying whether the user input is a first response type or a second response type; when the user input is the first response type, updating a first value; and when the user input is the second response type, updating a second value; receiving a user interaction by an original sender associated with the sending device: and in response to receiving the user interaction by the original sender: displaying the first value and the second value.

According to an embodiment, a method comprises: displaying, on a display coupled to an electronic computing device, a graphical user interface (GUI) that includes an email message and a button; monitoring, by the electronic computing device, user interactions with the button that is displayed in the GUI; while monitoring the user interactions with the button, detecting a user interaction with the button; and based on the detecting of the user interaction with the button, displaying, by the display an email GUI. The method may further include toggling the display to display a response information GUI that includes information summarizing selections input in response to the email message. The response information GUI is two-dimensional grid shaped. The response information GUI is configured to receive input by the addressee of the email message.

BRIEF DESCRIPTION OF DRAWINGS

The above and other aspects, features, and advantages of certain embodiments of the disclosure will be more apparent from the following description taken in conjunction with the accompanying drawings, in which:

FIGS. 3C-3H illustrates an electronic display device's display of examples of an EAR Tracking GUI, according to certain embodiments;

FIGS. 4A, 4B, and 5-7 illustrates an electronic display device's display of examples of an EAR Tracking GUI, according to certain embodiments.

Throughout the drawings, it should be noted that like reference numbers are used to depict the same or similar elements, features, and structures.

DETAILED DESCRIPTION OF THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. The terminology used herein is for the purpose of referring to specific embodiments only, and is not intended to limit the invention.

The terms and words used in the following description and claims are not limited to the bibliographical meanings, but are merely used by the inventor(s) to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents. Unless defined otherwise, all terms including technical and scientific terms used herein have the same meaning as commonly understood by those of ordinary skill in the art to which the present disclosure belongs. Commonly used terms defined in a dictionary are additionally interpreted as having a meaning consistent with the related technical literature and the presently disclosed content, and unless defined, are not interpreted in an ideal or very formal meaning.

As used herein, the singular forms "a," "an," and "the" include the plural forms unless the context clearly indicates otherwise. Thus, for example, reference to "an element" includes reference to one or more of such elements. The meaning of "comprising," as used herein, specifies a particular characteristic, region, integer, step, operation, element and/or component, and other specific characteristic, region, integer, step, operation, element, component, and/or group. It does not exclude the existence or addition of anything.

With reference to the accompanying drawings, the embodiments of the disclosure will be described in detail so that those of ordinary skill in the art can easily carry out the embodiments. However, the inventive concepts may be embodied in several different forms and is not limited to the embodiments described herein.

According to various embodiments, the present disclosure provides features and components to increase user friendliness/ease of use of methods for capturing, tracking and/or displaying reply/response information including by way of navigation of display user interfaces (e.g., GUIs).

Email Addressee Response Tracking System

Figure 1A:
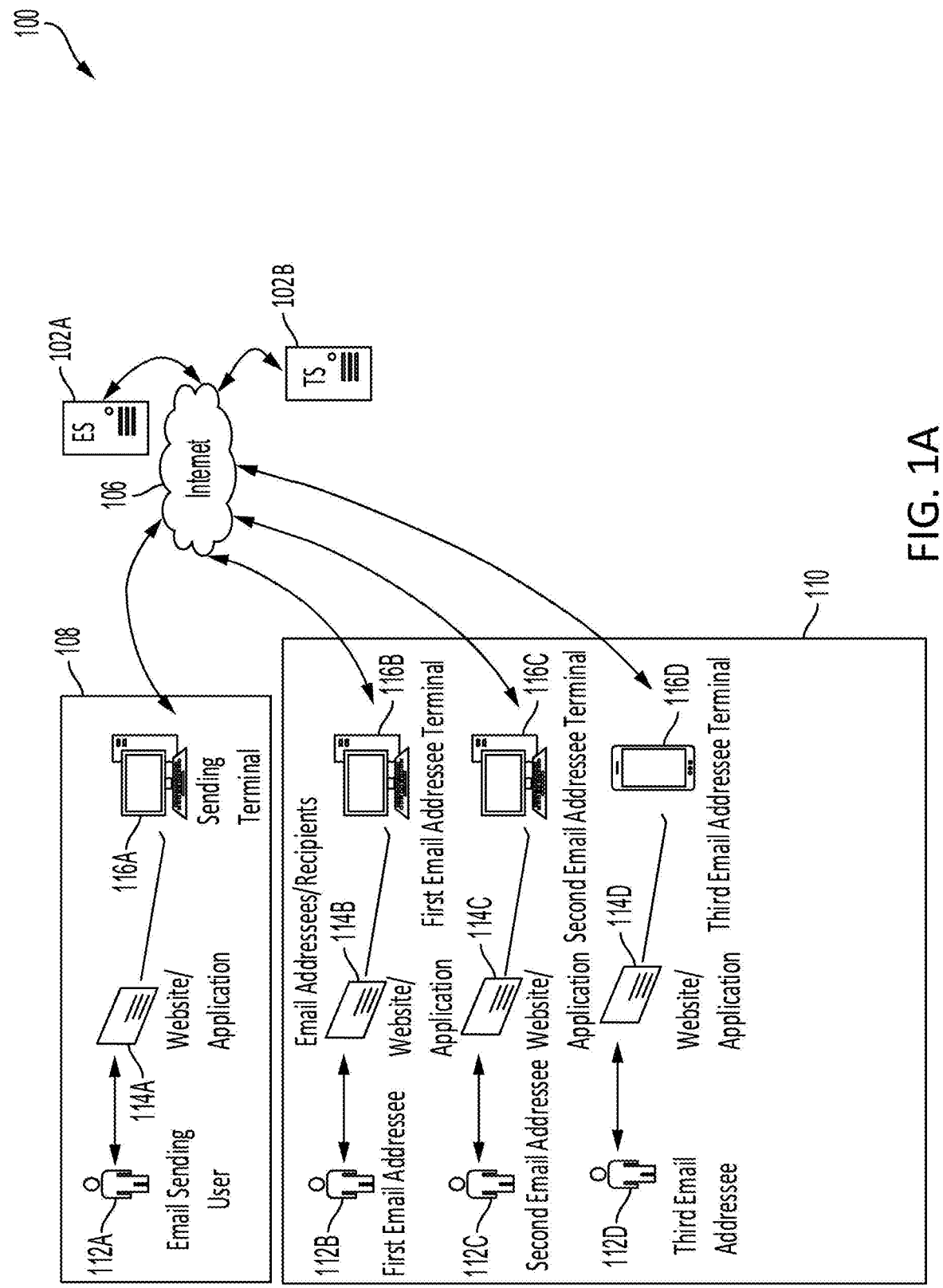
FIG. 1A illustrates a diagram of a networked computer system that may execute a method, according to an embodiment.

FIG. 1A illustrates a diagram of a networked computer system 100 that may execute a method, according to an embodiment. The networked computer system 100 may be an email acknowledgement service and/or an email addressee response tracking system. The networked computer system 100 may include one or more responsive servers (e.g., an email server 102A, an email addressee tracking server 102B), an email sending user terminal 116A, and one or a plurality of user devices or terminals (e.g., user terminals including the first email addressee user terminal 114B, the second email addressee user terminal 114C and the third email addressee user terminal 116D. The user terminals may correspond to electronic computing devices. Although three addressee user terminals are shown, the number of addressees is unlimited (e.g., up to any email application constraints) and more than three email addressees may be provided for without departing from the scope of the present disclosure (e.g., there may be a fourth, a fifth, . . . an Nth email addressee user terminal).

The user terminals 116A-116D, which may be referred to as electronic computing devices, may be communicably connected via a network 106 (Internet 106) to communicate with the responsive servers (e.g., an email server 102A, an email addressee tracking server (TS) 102B). The user terminals 116A-116D may each correspond to an electronic computing device 150 described in FIG. 1B, and the servers 102A and/or 102B may each correspond to the server 180 described in FIG. 1C.

According to an embodiment, the networked computer system 100 may include a plurality of user accounts stored in a database of the server 102. Each of the user accounts may be associated with one or more users 112A-112D, such as an email sending user 112A, a first email addressee user 112B, a second email addressee user 112C, and a third email addressee user 112D. Each of the users 112A-112B may have user accounts that correspond to email accounts (e.g., where a user logins to access their email messages).

Figure 1B:
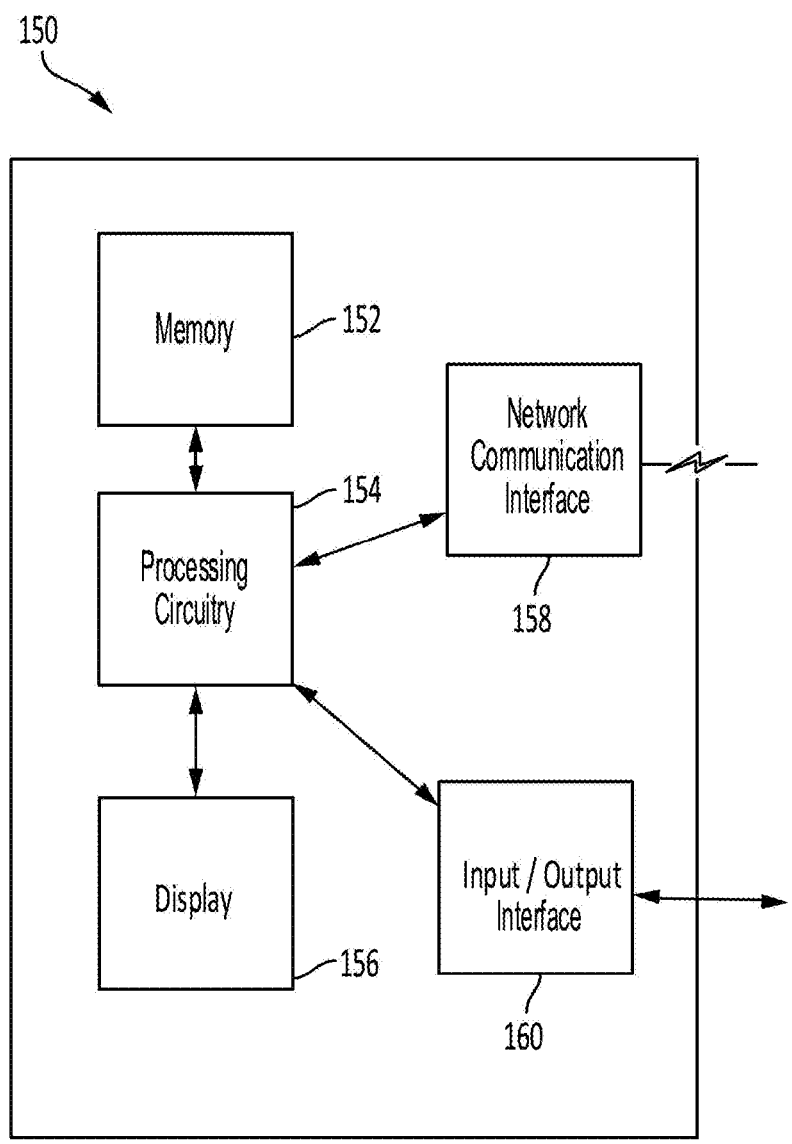
FIG. 1B illustrates a detailed view of an electronic computing device that can be used to implement the various components and/or methods described herein, according to certain embodiments.

The user terminals/electronic computing devices 116A-116C are shown as desktop computers, and the computing device 116D is shown as a smartphone (mobile device). Although the example user electronic computing devices are shown in the drawings as smartphones and/or desktop computers with monitors, the electronic computing device/ user terminals may be any type of electronic computing device that may be used, such as a desktop personal computer (PC), a smartphone (mobile device), a tablet computer, a laptop computer, a personal digital assistant (PDA), or an e-book reader, and the like. The user terminals 116A-116D may include a memory, a communication interface, a display, and a processor, as shown in FIG. 1B.

The user computing devices (or user terminals) 116A-116D may correspond to any electronic computing device that a respective user 112A-112D is logged into. In this respect, for example, when the email sending user 112A is logged into the website or application 114A, the current electronic computing device the email sending user 112A is using is the email sending user 112A's sending user terminal 116A. When the email sending user 112A logs in from a different electronic computing device, that different electronic computing device is the email sending user's user terminal 116A. The software is application driven, and hence, it does not matter which electronic computing device/user terminal a user logs into, as the application is accessible from different connected computing devices.

The sending user terminal 116A is an electronic computing device having an email sending user logged in. An email sending user is a user designated as the email's author or original sender. The sending user terminal 116A may communicate with the other user terminals 116B-116D and/or with responsive servers 102A and/or 102B over the network 106. The email sending user terminal 116A may execute certain tasks. In an embodiment, the computing device and/or server may perform the method 200 or method 300.

The email addressee user terminals 116B-116D are electronic computing devices having an email addressee user logged in. An email addressee is an email application user that is addressed in an email message sent from the email sending user 112A. The email addressee user terminals 116B-116D may communicate with the other user terminals 116B-116D and/or the responsive servers 102A and/or 102B over the network 106. The email addressee user terminals 116B-116D may perform various operations, including being on the receiving/display end of the method 200 of FIG. 2 and/or the method 300 of FIG. 3. Portions of the method 200 of FIG. 2 and/or the method 300 of FIG. 3 may overlap.

As described above, the electronic computing devices 116A-116D may perform various operations and/or methods described herein. The responsive servers may perform some or all the processing with relation to the methods performed by the electronic computing devices 116A-116D.

The email server may be a Client-Server Model and be integrated with an ESP (Email Service Provider), such as Gmail, Outlook, Yahoo, AOL, Hotmail etc. The sender is an author of an email, in embodiments.

Electronic Device

FIG. 1B illustrates a detailed view of an electronic computing device 150 that can be used to implement the various components and/or methods described herein, according to certain embodiments. Any of the user terminals 116A-116D may correspond to electronic computing device 150. The detailed view illustrates various components that may be included in either the electronic computing device 150 or the server 180 illustrated in FIG. 1C.

In an embodiment of the disclosure, as shown in FIG. 1B, the electronic computing device 150 may include one or more memories 152. and processing circuitry 154 (e.g., a controller, a hardware processor). The one or more memories 152 may hereinafter be referred to as a memory 152 or a local memory 152. The local memory 152 may be a local data storage. The memory 152 may include one or more storage devices and associated computer-readable media, such as, a hard drive, or a solid-state drive. The processing circuitry 154 may include and provide functionality because of one or more processors (e.g., a hardware processor, a virtual processor, a distributed processor, central processing units (CPUs), a specialized processor, such as Graphics Processing Units (GPUs), Application Specific Integrated Circuits (ASICs)) executing software embodied in one or more tangible, computer-readable media. Such media may be media associated with a storage device, memory devices or chips. internal mass storage (e.g., Read-Only Memory (ROM), a Random-Access Memory (RAM)), a Compact Disc (CD), a Digital Versatile Disc (DVD), a thumb-drive, a removable hard drive, a solid-state drive, legacy magnetic media (e.g., a tape drive, a floppy disc drive), a specialized ASIC-based device, and/or the like. The software implementing various embodiments of the present disclosure can be stored in the storage devices and/or media executed by the processing circuitry 154. "Computer readable media" or "computer readable medium" as used in connection with the specification encompass non-transitory media, transmission media, and/or carrier waves.

The computer readable media and/or memory 152 may store computer code (software) for performing various computer-implemented functions. The computer code may include instructions that, when executed by the processing circuitry 154, causes the processing circuitry to execute various functions, processes, parts operations and/or methods (collectively referred to hereinafter as functions or operations). The various functions, operations, and methods pertinent to this disclosure are explained in detail below. However, other functions, operations and methods that are known to one or ordinary skill in the art could also be performed. The processing circuitry 154 may be configured to perform the various operations (e.g., by being programmed to do so via computer executable instructions) discussed in more detail herein.

The software may cause the processing circuitry 154 and specifically the processor(s) to execute particular processes or particular parts of particular processes described herein, including defining data structures stored in RAM and modifying such data structures according to the processes defined by the software. In addition, or as an alternative, the processing circuitry 154 may provide functionality because of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

As shown in FIG. 1B, the electronic computing device 150 may also include or be at least configured to be electrically connected (or wirelessly connected) to one or more output devices (e.g., peripheral, or internal). The electronic computing device 150 may use the input/output interface 160 to communicate with one or more peripheral devices, such as, one or more of: a display device (e.g., an external desktop monitor or a touch screen display panel), a keyboard, a microphone (e.g., for voice input), a camera (e.g., for gesture input), a mouse, a speaker, a microphone, a joystick, a scanner, a trackpad, a printer, and/or a biometric capture device (e.g., a device that captures one or more of:

fingerprint, palm print, iris information). The peripheral devices may include user input devices (e.g., a mouse, keyboard, microphone) and/or output devices (e.g., speaker, display) and be connected to the processing circuitry 154 by the network communication interface.

The display 156 may include any type of display including a projector or a display screen, such as, a touch screen display panel, an organic light-emitting diode (OLED) screen, a liquid crystal display (LCD) screen, a cathode ray tube (CRT) screen, and/or glasses. The display 156 may be electrically coupled to the processing circuitry 154 and the processing circuitry 154 may be configured to control (or cause) the display 156 to display information (e.g., display the information discussed in the methods and operations below). The display 156 may be provided on an outer surface of a housing of an electronic computing/display device (e.g., a smartphone) or be an external display monitor connected to a standalone electronic computing device (e.g., a PC connected to a monitor, where the monitor is the display).

The electronic computing device 150 may further include a communication interface 158 electrically coupled to the processing circuitry 154. The communication interface 158 may be configured to receive data transmitted from one or more electronic devices (e.g., user terminal devices, other electronic display devices) and/or one or more servers. The communication interface 158 may be a network communication interface 158. Networks may be, for example, wired, wireless, or optical. Networks can provide real-time data transfer and include a local area network (LAN), a wide-area network (WAN), and/or the Internet. Examples of networks include Ethernet, wireless LANs, cellular networks (e.g., Global System for Mobile Communications (GSM), 3G, 4G, 5G, Long-Term Evolution (LTE)).

The communication interface 158 may be configured to transmit, via, for example, control by the processing circuitry 154, data to the one or more electronic devices over a network (wired or wirelessly). The processing circuitry 154 may also include interface to one or more communication networks (e.g., via the communication interface 158). The processing circuitry 154 may be configured to control (or cause) the display 156 to display information, or alternatively, transmit the display information over the communication interface 158 to another electronic computing device, or over the input/output interface 160 to a standalone display device for external display.

The input/output interface 160 may be wired (e.g., universal serial bus (USB) drive, external RAM/ROM, external processor, data port) or wireless (e.g., short-range communication protocols, syncing, Bluetooth®, radio frequency (RF), near field communication (NFC) or Wi-Fi®)). The communication interface 158 may be a wireless (e.g., short-range communication protocols, syncing, Bluetooth®, radio frequency (RF), near field communication (NFC) or Wi-Fi®) input/output interface 160.

Figure 1C:
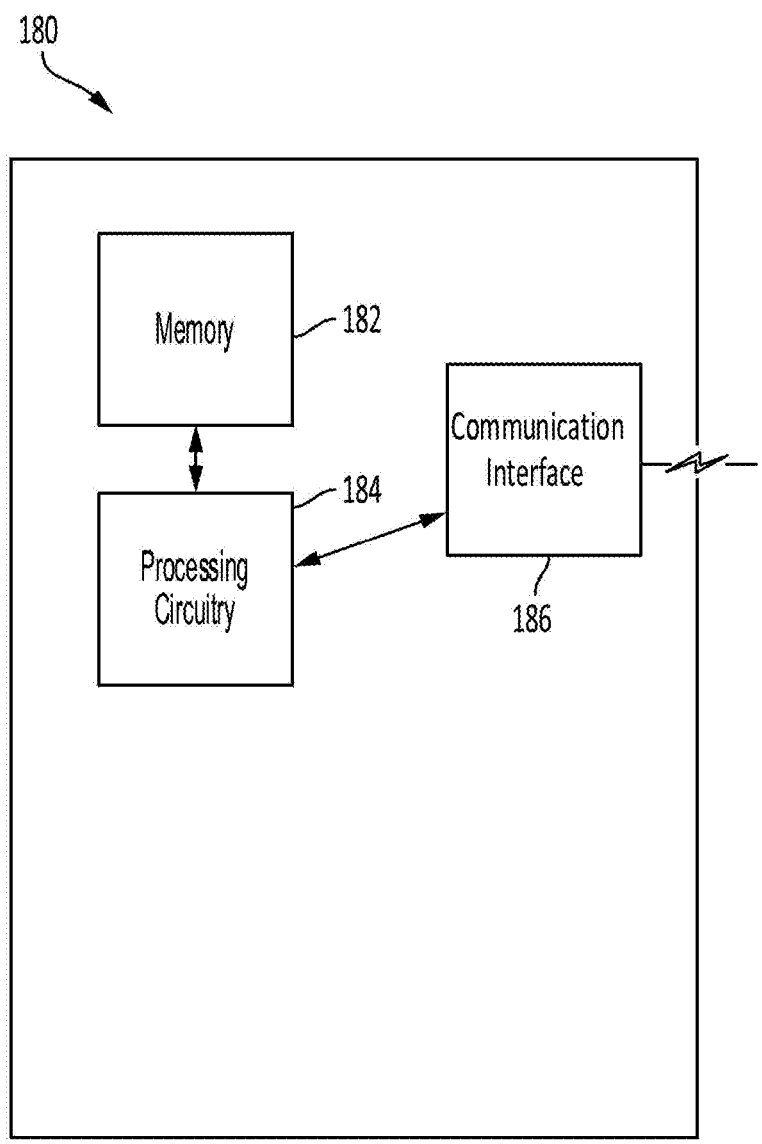
FIG. 1C illustrates a detailed view of a responsive server that can be used to implement the various components and/or methods described herein, according to some embodiments.

FIG. 1C illustrates a detailed view of a responsive server 180 that can be used to implement the various components and/or methods described herein, according to some embodiments. In particular, the responsive servers 102A and/or 102B in FIG. 1A may correspond to the responsive server 180 illustrated in FIG. 1C. The detailed view illustrates various components that may be included in either the electronic computing device 150 illustrated in FIG. 1B or the responsive server 180 illustrated in FIG. 1C. In an embodiment of the disclosure, as shown in FIG. 1C, the responsive server 180 may include one or more memories 182 (e.g., a local memory or local data storage) and processing circuitry 184 (e.g., a controller, a hardware processor). The responsive server 180 may further include a communication interface 180 electrically coupled to the processing circuitry 184. The communication interface 186 may be configured to receive data transmitted from one or more external electronic computing devices (e.g., electronic computing devices 116A-116D), and/or one or more other servers.

The processing circuitry 184 may be configured to store, in the memory 182, data received from various sources over the network. For example, the processing circuitry 184 may be configured to store email information received as data from the communication interface 186.

The responsive server 180 may be configured to provide automatic real time updates to the respective electronic computing devices, as discussed below. Real time may correspond to instantaneous, near real time (near instantaneous) or a combination thereof. The processing circuitry 184 may be connected to each of the other components of the server 180 and may one or more of the components of the electronic device 150 of FIG. 1A.

The components shown in FIGS. 1A-1C are exemplary in nature and are not intended to suggest any limitation as to the scope of the disclosure. While explaining the responsive server 180 according to certain embodiments, a detailed description of the contents (e.g., processing circuitry, media, memory, communication interface) overlapping with the electronic computing device 150 were/are omitted. According to an embodiment, the electronic computing device structure and/or functionality may also be performed by the responsive server 180. According to an embodiment, the functionality of the server may be performed by the electronic computing device (or user terminal) 150. The functionality of the electronic computing devices, as defined by the logged in user, may also be performed by one of the other user terminal electronic computing devices.

Figure 2:
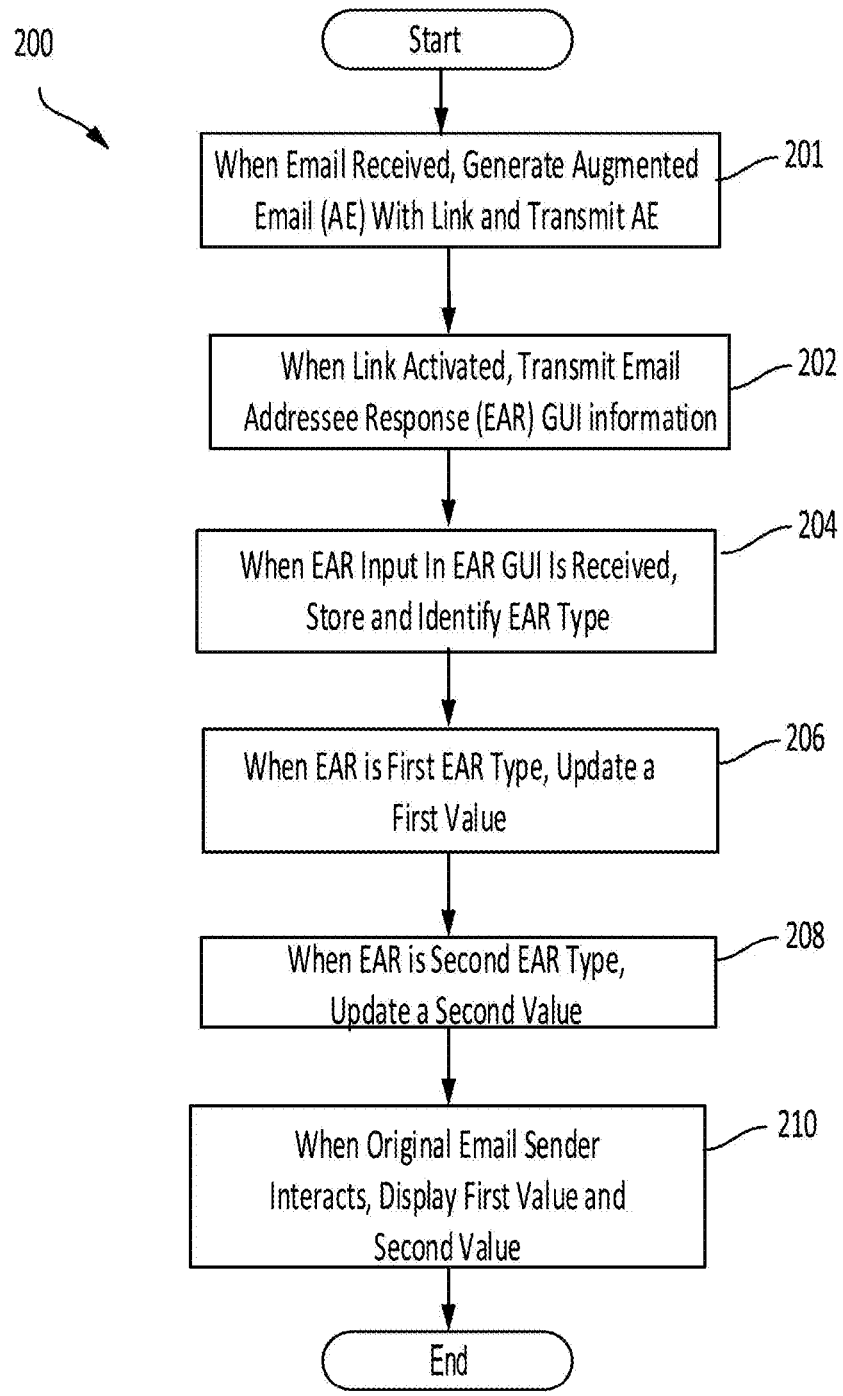
FIG. 2 illustrates a flow chart of a real time responsive server method performed by processing circuitry, according to certain embodiments of the disclosure.

FIG. 2 illustrates a flow chart of a real time responsive server method 200 performed by processing circuitry, according to certain embodiments of the disclosure. The processing circuitry may correspond to the processing circuitry 154 or 184 discussed in FIGS. 1B and 1C above, or correspond to a combination of the processing circuitry of the electronic computing device 150 being controlled by (or receiving user interface information from) the responsive server 180. As discussed below, the processing circuitry 154 or 184 may be configured to execute code (instructions code) stored in a memory, which causes the processing circuitry to execute a method, including one provided by a website and/or an application. The real time responsive server method 200 executed by the processing circuitry 154 and/or 184 may include Operations 201-210, as shown in FIG. 2, according to an embodiment. Although the Operations 201-210 are shown in an order in FIG. 2, the Operations 201-210 may be performed in a different order.

With reference to FIG. 2, according to an embodiment, the processing circuitry may be configured to perform a real time responsive server method 200 including the following operations: when email received, generating augmented email (AE) with link and transmit the AE (Operation 201), when the link is activated, transmitting email addressee response (EAR) GUI information (Operation 202), when the EAR is input into the EAR GUI and the EAR is received, storing the EAR and identifying an EAR type of the EAR (Operation 204), when the EAR is a first EAR type, updating a first value (Operation 206), when the EAR is a second EAR type, updating a second value (Operation 208), and when the original email sender interacts with a tracking GUI, transmitting displayable information including the first value and the second value to the user terminal corresponding to the original email sender (Operation 210).

Figure 3A:
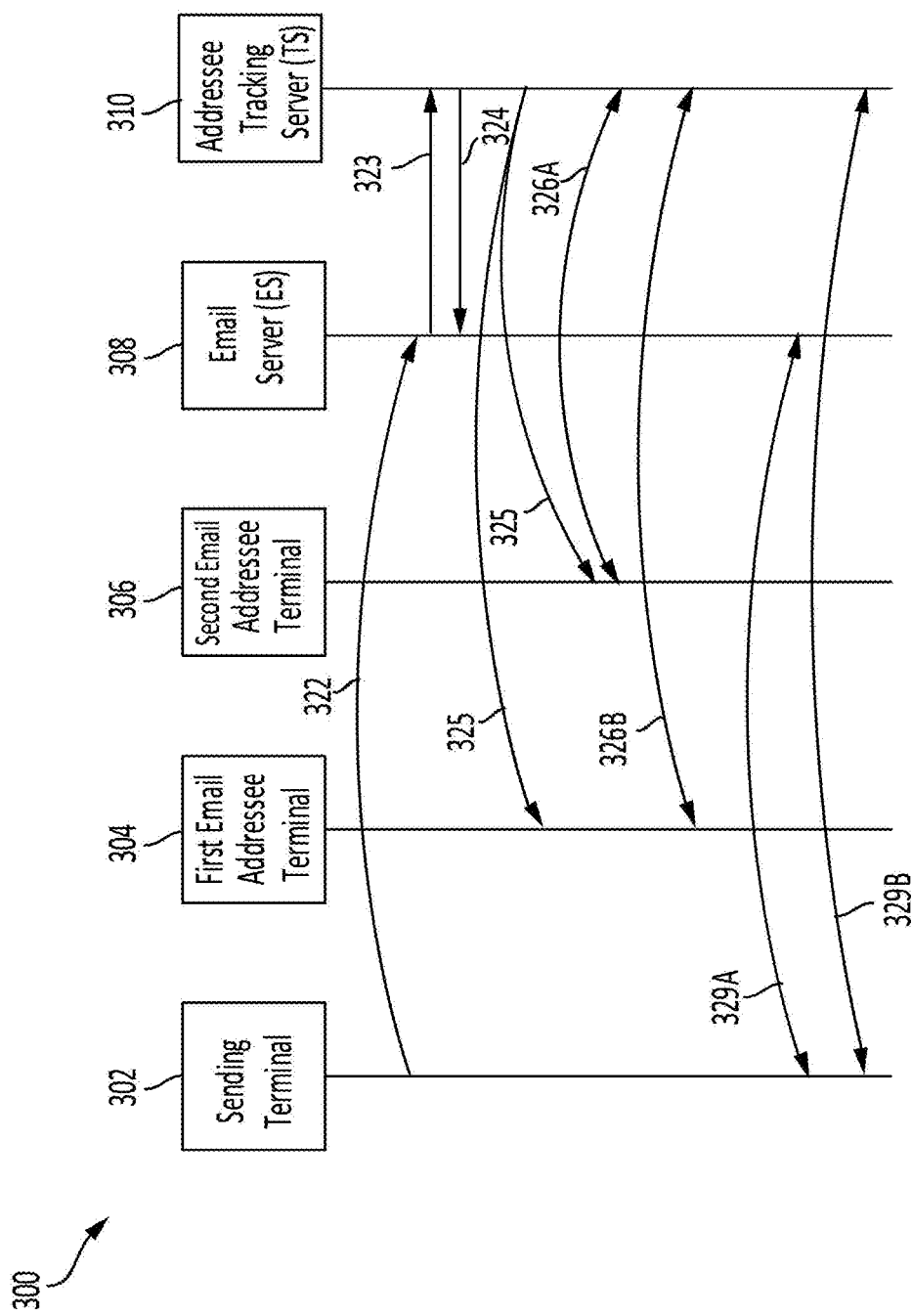
FIG. 3A illustrates network requests/transmissions of a real time responsive server method performed by processing circuitry, according to certain embodiments of the disclosure.

According to an embodiment, the method 200 may correspond to a responsive server system method 300 performed by one or more hardware servers, as shown in FIG. 3A. FIG. 3A corresponds to FIG. 2 but focuses on showing only network transmissions. Please note that although an example order of operations is shown, the operations may be performed in different orders.

Referring to FIG. 3A, the responsive server method 300 may comprise: receiving, from a sending electronic terminal device, an email addressed to at least one email addressee (Operation 322); in response to receiving the email from the sending electronic terminal device: accessing a status update link stored in a database of the one or more hardware servers; generating an augmented email having the status update link included with the received email; and transmitting, over the network, the generated augmented email having the status update link to respective electronic devices of each of the at least one email addressee (Operation 325). Operation 325 is shown where the at least one email addressee includes two email addressees (i.e., the first email addressee terminal 304 and the second email addressee terminal 306). Prior to transmission of the augmented email from having the status update link to the at least one email addressee (Terminals 304, 306) from the addressee tracking server 310 (Operation 325), the original email may be transmitted from the email server 308 to the email addressee response (EAR) tracking server 310 (Operation 323), whereby the addressee tracking server 310 generates the augmented email. However, the email server 308 and the addressee tracking server 310 may be the same device and/or located within a same area or network (and hence Operation 323 may be unnecessary). An optional Operation 324 may occur where Operation 324 includes transmitting the link to the email server 308 from the addressee tracking server 310 so that the original sending terminal 302 may access the EAR GUI when the original sender clicks the link.

The method may further include network communication between the terminals 304, 306 and the addressee tracking server 310 (Operations 326A, 326B). The Operations 326A, 326B may include: receiving an indication of a user interaction with the status update link; in response to receiving the indication of the user interaction with the status update link by the addressee tracking server 310: accessing email addressee graphical user interface (GUI) information; and transmitting, over the network, the email addressee response GUI information to the respective interacting user terminal 304 or 306; receiving response information submitted in the email addressee response GUI: and in response to receiving the response information submitted in the email addressee response GUI: storing, by the addressee tracking server 310, the response information in the database in association with the email addressee; identifying whether the user input is a first response type or a second response type; when the user input is the first response type, updating a first value; and when the user input is the second response type, updating a second value.

The sending terminal 302 may interact with the email server 308 (Operation 329A) to perform an email function, and similar to Operations 326A and 326B, the sending terminal 302 may click the link and view the EAR GUI (i.e., receiving the link to a tracking GUI. receiving a user interaction by an original sender associated with the sending device: and in response to receiving the user interaction by the original sender: displaying the first value and the second value). The server 308 and server 310 may be same device and correspond to electronic device 150 or server 180.

According to certain embodiments, "when", "in response to" and "based on" are considered trigger condition statements, and may be used interchangeably to mean a same or similar instance of a trigger condition. The EAR GUI may be referred to as an EAR Tracking GUI or a tracking GUI.

Status Update Link ("Respond" Button)

Figure 3B:
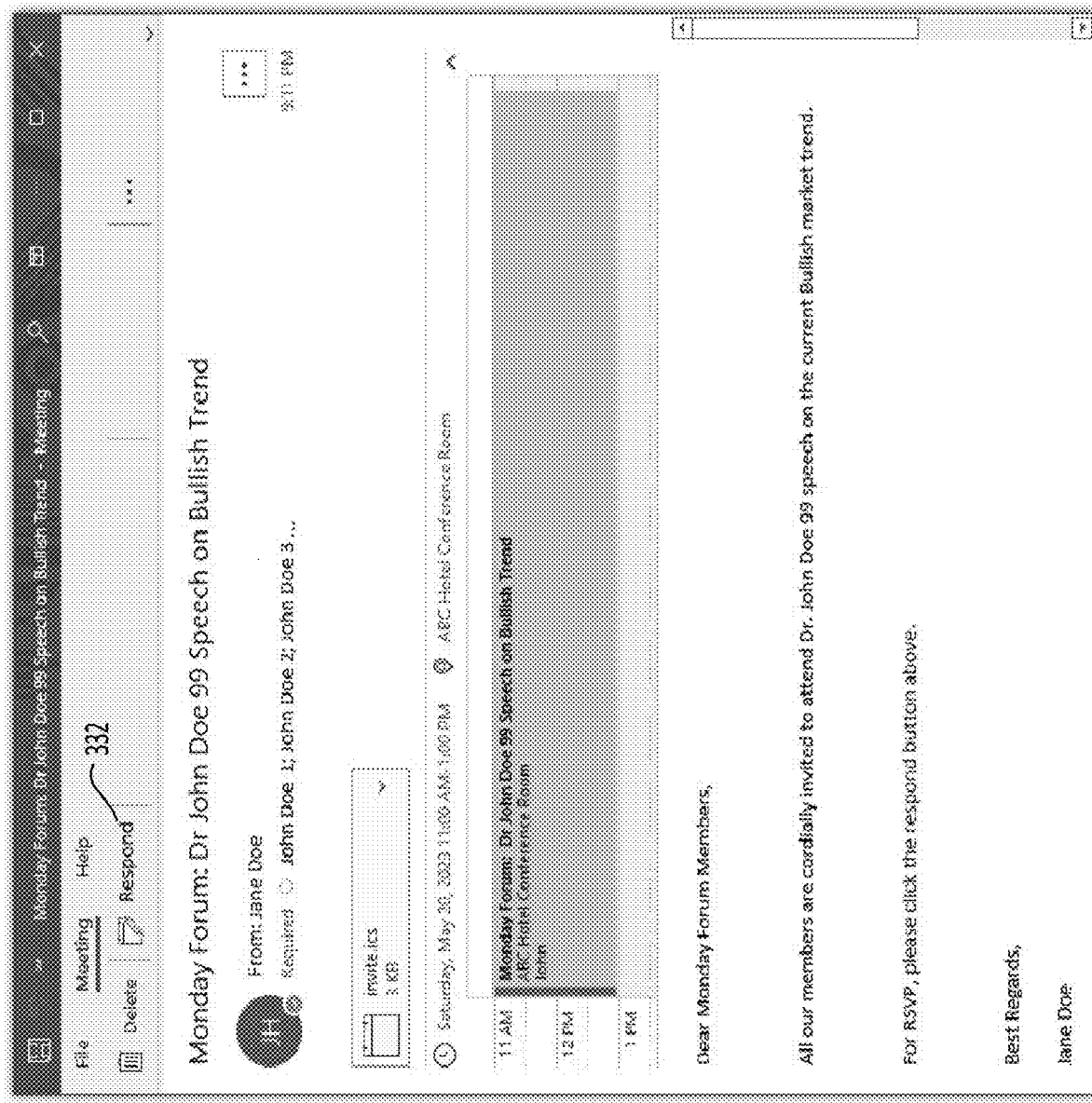
FIG. 3B illustrates an electronic display device's display of example of an email GUI with a respond button, according to certain embodiment.
Figure 3C:
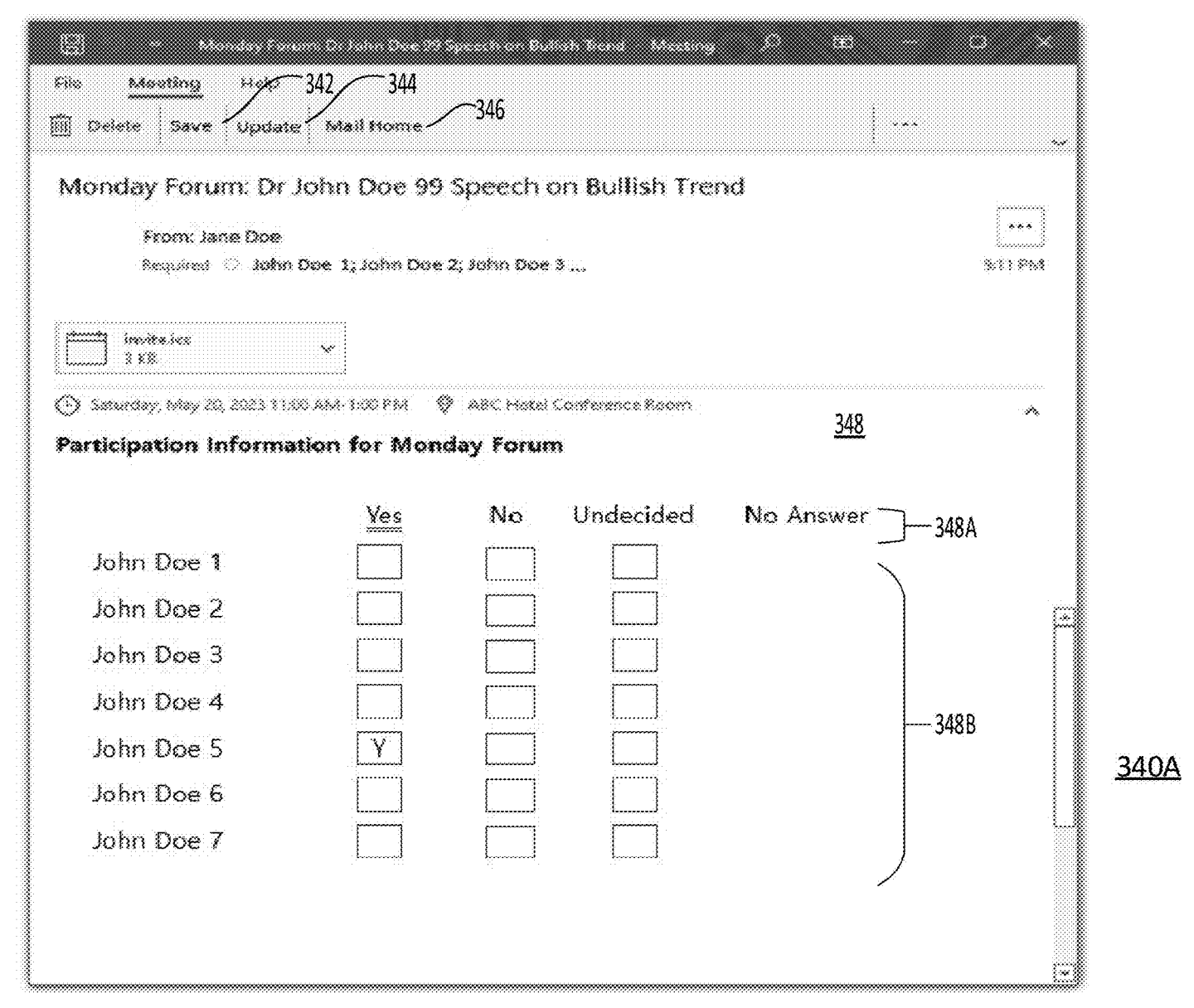
Figure 3D:
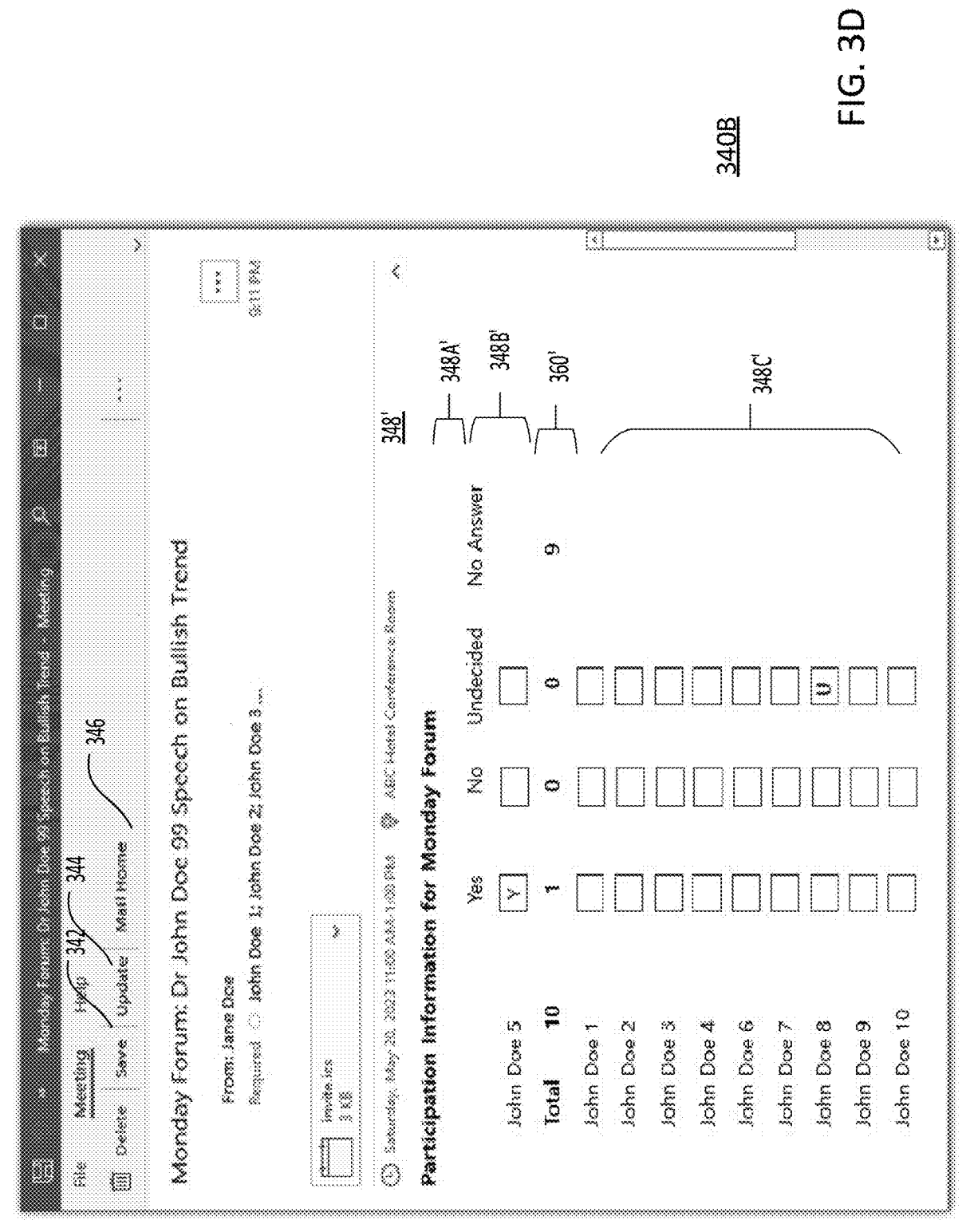
Figure 3E:
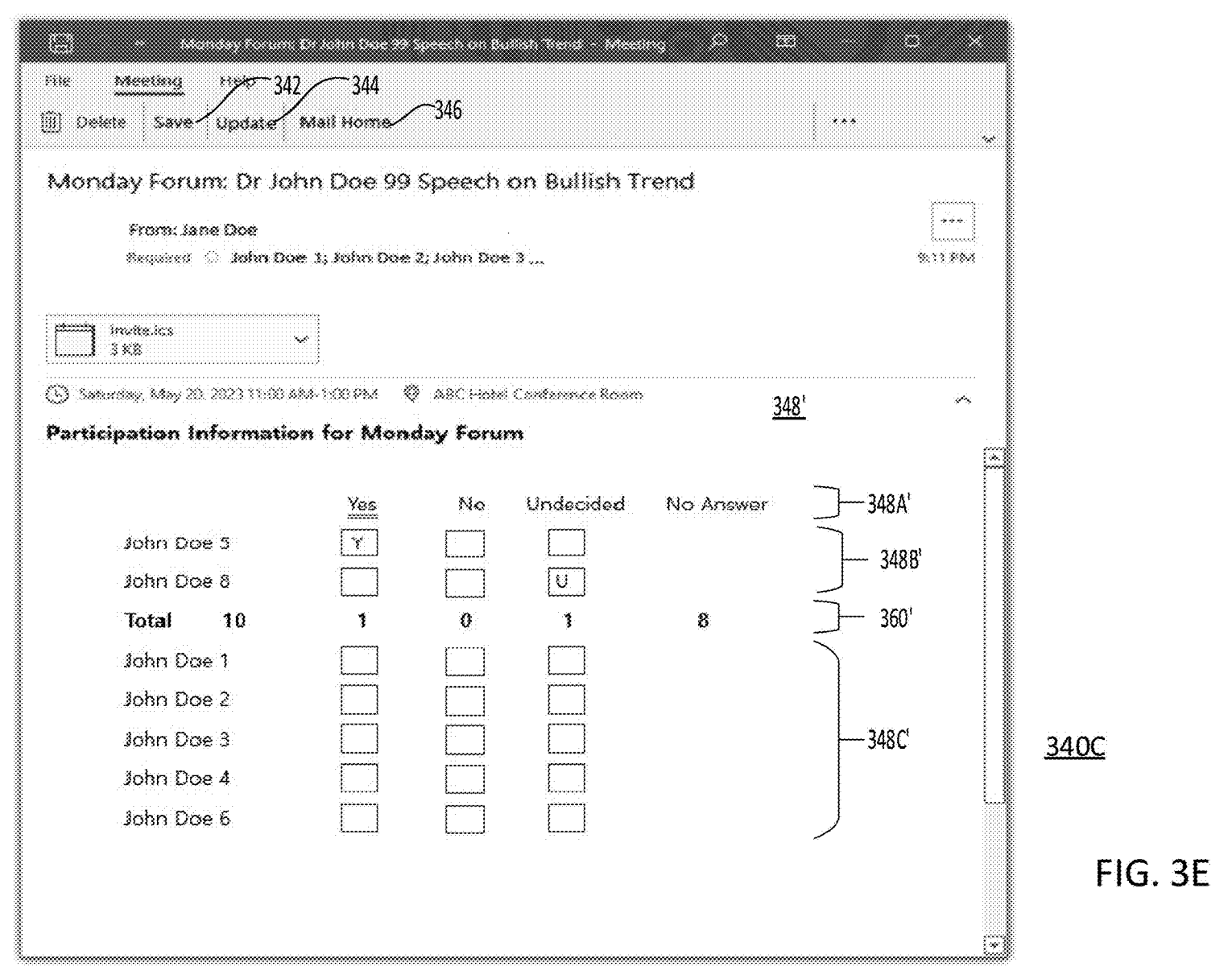
Figure 3F:
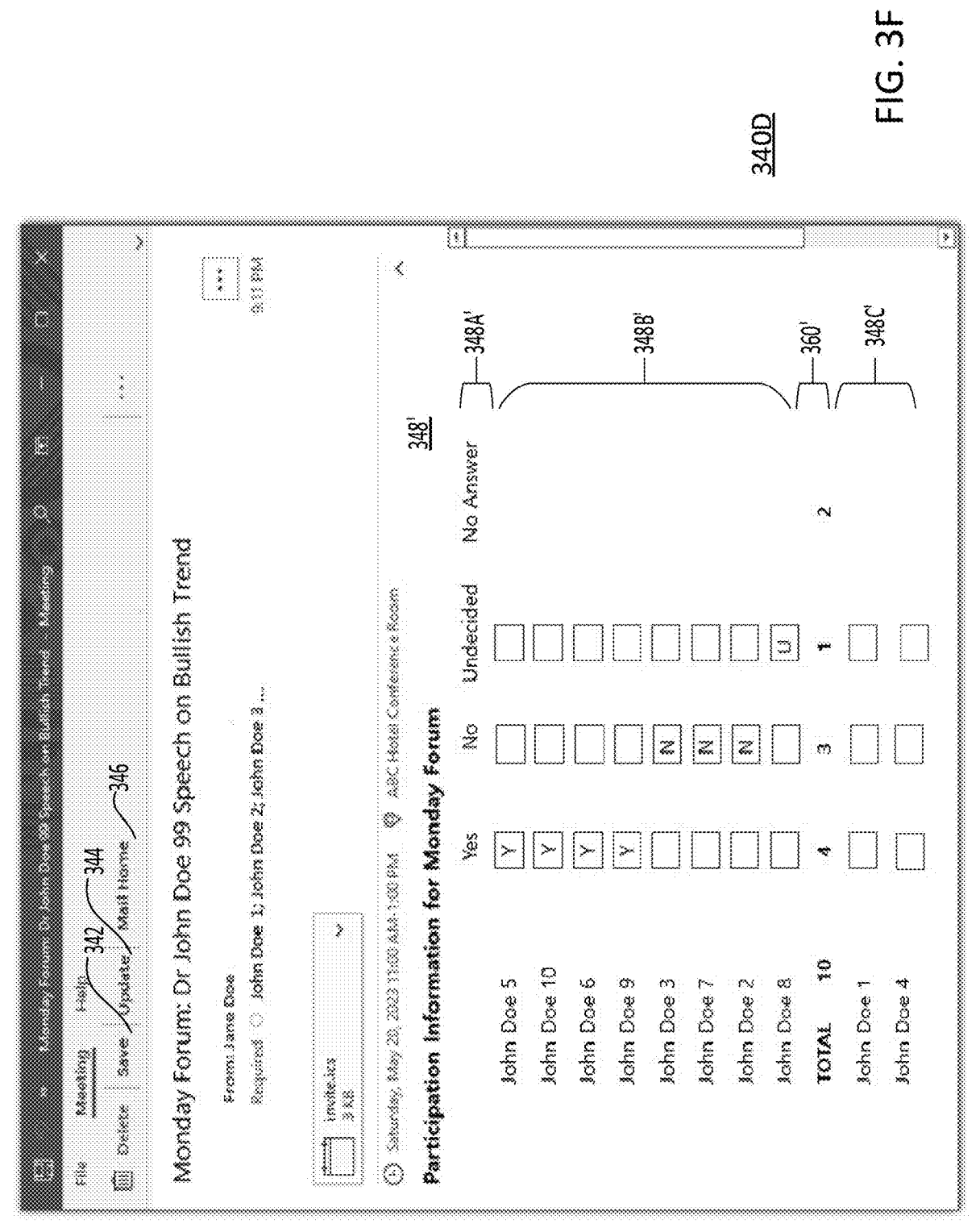
Figure 3G:
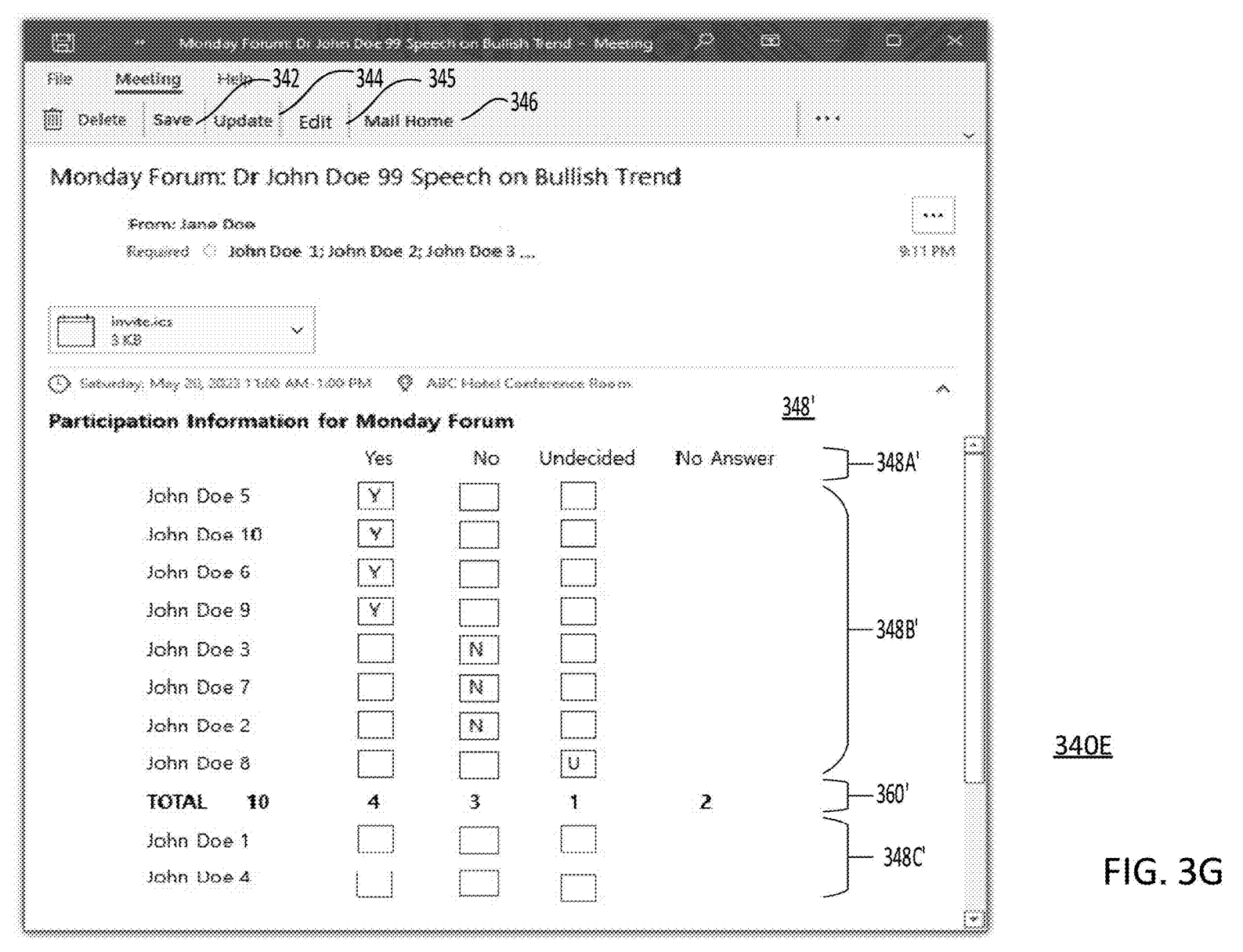
Figure 3H:
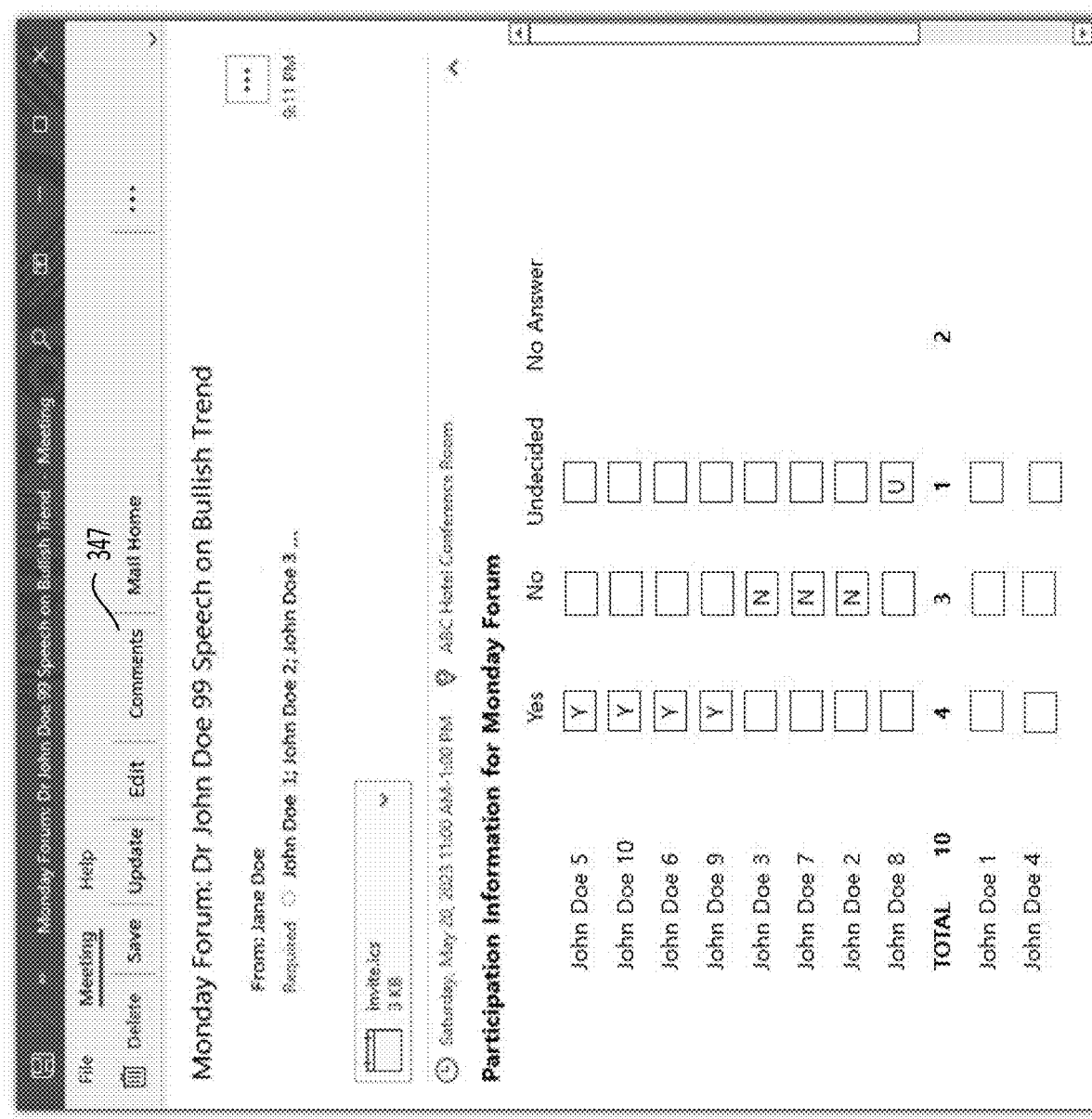

As discussed above, the augmented email may include a status update link. The status update link may include identifying information to cause the EAR Tracking GUI to be displayed. The status update link may be embedded in a button in an email message. For example, as shown in FIG. 3B, an email meeting request GUI 330 (based on an email meeting request sent to the user (email addressee)) includes a respond button 332. FIG. 3B illustrates an electronic display device's display of an example of an email GUI 330 with a respond button 332, according to certain embodiments. Electronic computing device 150 may be considered an electronic display device and/or be connected to an electronic display device (e.g., a monitor). In response to a user selecting and/or touching the respond button 332, the respective EAR GUI may be displayed. When an interaction (e.g., click, selection, tap) with the respond button 332 is detected, an EAR tracking GUI may be displayed. That is, the email GUI 330 may be replaced by an EAR tracking GUI, which may allow a user to enter response/reply data and/or view response/reply data entered by other email addressees. The home mail button 346 (described below) of the EAR tracking GUIs may allow a user to return to the email GUI 330 (and hide the EAR tracking GUI).

EAR Tracking GUIs

The EAR Tracking GUI may be referred to as a Tracking GUI and/or an EAR GUI. FIGS. 3C-3G, 4A, 4B and 5-7 illustrate examples of EAR Tracking GUIs.

FIG. 3C illustrates an electronic display device's display of an example of an EAR Tracking GUI 340A. The EAR Tracking GUI 340A may be considered a Participation or Meeting Attendance GUI. The GUI 340A shows a scenario of a reply answer (response) being entered and transmitted to the EAR server (e.g., the TS server 102B). In particular, FIG. 3C shows immediately after John Doe 5, who may be the email addressee, has input (e.g., typed in) a 'Y' in the Yes column on the row of his name ("John Doe 5" row). After the user (John Doe 5) has finished inputting the character 'Y', the user ("John Doe 5") may hit/tap/select the save button 342, which causes the information (the 'Y' for John Doe 5) to be transmitted to the EAR tracking server to update the reply table database. In addition, the updated database results may be displayed on the area 348B, such as when the user clicks the update button 344. The header information 348A of the sub screen 348 shows what each column indicates (e.g., Yes/Attend, No/Won't Attend, Undecided, No Answer/Response). The mail home screen 346 may be used to toggle back to the original email message GUI (e.g., of FIG. 3B).

FIG. 3D illustrates an electronic display device's display of an example of an EAR Tracking GUI 340B. The EAR Tracking GUI 340B may be considered a Participation or Meeting Attendance GUI, and may be showing a current status of the updated Reply Table Data, in the database in the EAR TS. The GUI 340B shows a scenario of a newly updated EAR GUI screen, according to various embodiments. In particular, after John Doe 5 has performed the scenario of FIG. 3C, John Doe 8 may see a screen similar to FIG. 3D, which includes John Doe 5's response data ('Y' for Yes Column at 348B') and a running Total Row 360'. The header information 348' may be the same or similar as the header information 348. The GUI 340B shows after John Doe 8 has typed in "U" in an Undecided Column in the display area 348C' of the reply data table sub screen 348'. When the save button 342 button is clicked, the database of the EAR TS is updated. When the update button 344 is clicked, reply table data is pulled from the EAR TS to update the reply data table 348'.

FIG. 3D illustrates an example of an EAR participation GUI 340 after an initial entry has been entered, according to certain embodiments. In response to a user selecting and/or touching the respond button 332 (FIG. 3B), then the EAR participation GUI 340 or 340' may be displayed.

The EAR participation GUI 340' may be configured to receive responses/replies from users (e.g., the email addressees). The EAR participation GUI 340' includes a save button 342, an update button 344 and a mail home button 346. The EAR participation GUI 340 may also include a reply (or response) table sub-screen 348 with editable fields or checkboxes. The Y-Axis of the reply table corresponds to the email addressees of the email (e.g., the email list in the "To:" field; the email list in the "To:", "Cc:", and/or "Bcc:" fields, and/or the Required and/or Optional fields). The X-axis (column headers 348A) of the EAR participation GUI 340 may correspond to different types of response options, such as, Yes (attend), No (Decline), Undecided, No Answer/Response. The reply table may include an area 348B that shows a table of replies next to each email addressee. The boxes in the area 348B may include editable boxes which may or may not be restricted based on email addressee (e.g., only John Doe 1 can edit John Doe 1's reply information row). As a default, each of the checkboxes (editable input fields) may be blank because no email addressee has replied yet.

According to an embodiment, the CC and BCC email addressees may be treated differently than the TO: field email addresses. For example, the CC: and BCC: email addresses may be considered not member and allowed to only have Read-Only access to the EAR Tracking GUI(s).

The displaying of the totals (e.g., 1 in row 360' of the Yes column in the GUI 340B, and 9 in the No Answer Column of GUI 340B) may correspond to displaying a first value and a second value, which may include displaying a response results GUI in a two-dimensional grid shaped format with the first value and the second value. The response results GUI (or EAR Tracking GUI) displays an indication of response status of each addressee that has responded, and each of the first value and the second value correspond to a summarization of the first response type and the second response type, respectively. The summarization of the responses includes a total number of the respective response types or an average value of the responses. The email addressee response GUI and/or the EAR Tracking GUI may be in a two-dimensional grid shaped format, which may be a checkbox type reply GUI and/or include user input fields or buttons. The EAR Tracking GUI includes the first value and the second value in the two-dimensional grid shaped format.

According to various embodiments, the accessing of the EAR GUI information includes identifying an email addressee of the email; and generating the EAR GUI information where the EAR GUI displays one or more editable user input fields in the two-dimensional grid shaped format on a row corresponding to the particular email addressee. The EAR GUI is configured to receive user input by the addressee of the email message only, according to certain embodiments. The email message is a meeting, appointment, or event invitation, according to various embodiments. The one or more hardware servers may include an email server and an EAR tracking server, and the responsive server system method may further comprise: in response to receiving the email from the sending electronic terminal device: transmitting, by the email server, the email to the email addressee tracking server; accessing, by the email addressee tracking server, a status update link stored in a database of the email addressee tracking server; generating, by the email addressee tracking server, the augmented email having the status update link included with the received email; transmitting, by the email addressee tracking server to the email server, the generated augmented email having the status update link; and transmitting, over the network by the email server, the augmented email having the status update link to respective electronic devices of each addressee of the received email.

The user interaction may correspond to selecting, tapping, or clicking a status update button displayed by the EAR GUI. The status button corresponds to a hyperlinked Uniform Resource Locator (URL). The first value and the second value are updated by adding, subtracting, accumulating, or averaging.

The email addressee response GUI is configured to receive input by the addressee of the email message. The first value is a first accumulated value that corresponds to a first type of response of one of: "Yes", "Wait", "No", or "Undecided", or "No Answer", the second value is a second accumulated value that corresponds to a second type of response of a different one of: "Yes", "Wait", "No", or "Undecided", or "No Answer", and the first type or response and the second type of response correspond a response to a meeting or appointment request, and the first type of response is different from the second type of response. The first value and the second values may correspond to total counts.

FIG. 3E illustrates an electronic display device's display of an example of an EAR Tracking GUI 340C. The EAR Tracking GUI 340C may be considered a Participation or Meeting Attendance GUI, and may be showing a current status of the updated Reply Table Data, in the database in the EAR TS. The GUI 340C shows a scenario of another update at the EAR TS, according to various embodiments. In particular, after John Doe 8 has performed the scenario of FIG. 3D, any email addressee recipient may see a sub screen 348' similar to FIG. 3E, which includes John Doe 5's response data ('Y' for Yes Column at 348B'), John Doe 8's response data ('U' for Undecided Column) and a running Total Row 360'. The GUI 340C shows after John Doe 8 has typed in "U" in an Undecided Column in the display area 348C' of the reply data table sub screen 348', which was after John Doe 5 enter his information. In addition, the GUI 340C may be displayed after the update button 344 is clicked to pull an update for the reply data table 348' from the EAR TS. In sum, FIG. 3E shows the replies of two email addressees having been updated at the reply table database in the EAR TS.

FIG. 3F illustrates an electronic display device's display of an example of an EAR Tracking GUI 340D. The EAR Tracking GUI 340D may be considered a Participation or Meeting Attendance GUI, and may be showing continuous updates of the reply data table of the database of the EAR TS. The GUI 340D shows a scenario of the reply data table 348' being continuously updated when other email addressees (e.g., any of the John Does) submit/save reply/response data. GUI 340D may be displayed after GUI 340C, according to various embodiments. In particular, the reply data table sub screen 348' shows the four email addressee's that have entered 'Y', the three email addressees that have entered 'N', and the one email addressee that has entered 'U' in display area 348B'. The sub screen 348' also shows the total 360' for each column, and the remaining email addressees (E.g., John Doe 1 and 4) 348C' who have not responded.

The GUI 340D may be displayed after the update button 344 is clicked to pull an update for the reply data table 348' from the EAR TS. In sum, FIG. 3E shows the reply data table 348' may be continuously updated whenever any email addressee replies. Further, any receiver or sender can access, at any time, the latest, most updated reply data table 348' through the update button 344 being clicked. According to an embodiment, as shown in FIG. 3F, the replies may be sorted out by reply type (e.g., the first-row group (JD 5, 10, 6 and 9) have the same reply type, as do the next two groups (the 'N' group, followed by the 'U' group)).

FIG. 3G illustrates an electronic display device's display of an example of an EAR Tracking GUI 340E. The EAR Tracking GUI 340E may be considered a Participation or Meeting Attendance GUI, and may be showing continuous updates of the reply data table of the database of the EAR TS, just like in FIG. 3F. In addition, FIG. 3G shows an edit button 345 for editing a previous response/reply (that has already been saved/pushed to the database of the EAR TS). Further, the total row 360' may include multiple totals (e.g., for each column but also for the total number of responses, which is 10 in FIGS. 3D-3H). FIG. 3G shows a scenario where a user, such as John Doe 5 decides he would like to change his previous reply data ('Y'). To do so, John Doe 5 may click the edit button 345, which may cause the John Doe 5 column to be blanked out and/or returned down to be displayed with the unanswered addressees 348C'. John Doe 5 may then input a new answer and click the save button 342 and the update button 344.

Waiting List EAR Tracking GUIs

Figure 4A:
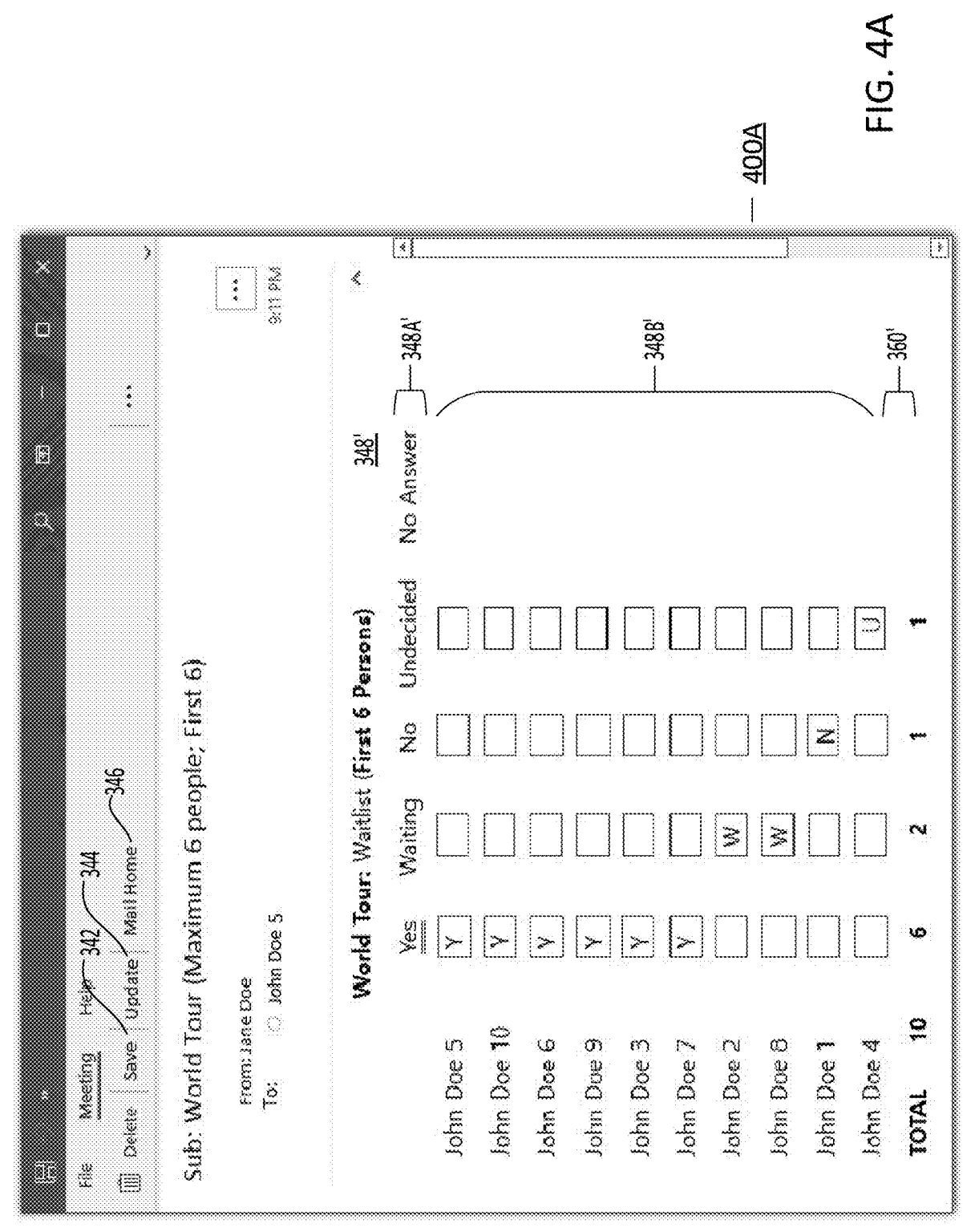

FIGS. 4A and 4B illustrate an electronic display device's display of Waiting List EAR Tracking GUIs, according to certain embodiments. For example, FIG. 4A shows a waiting list EAR Tracking GUI 400A, which may include a similar structure as the EAR Tracking GUIs of FIGS. 3C-3G but may also include a "waiting" column in the reply data table 348' of the GUI 400A (See, e.g., the header 348A' of GUI 400A which includes "waiting"). According to an embodiment, only when one person cancels from the YES Group, another person from the waiting Group may be automatically, moved up to the YES Group. In the example of FIG. 4A, the maximum number of people, which may be defined by the original email sender and/or the creator of the EAR GUI, is set in advance to be no more than 6 people maximum. FIG. 4B further shows a waiting GUI 400B that is similar to waiting GUI 400A but also includes an additional column "Reply Time" in the reply data table 348' and the header information 348A'. The reply time may correspond to a timestamp (e.g., date and/or time), and may be transmitted to the TS by each receiver, and the timestamp information may be stored and displayed as shown in FIG. 4B.

Figure 5:
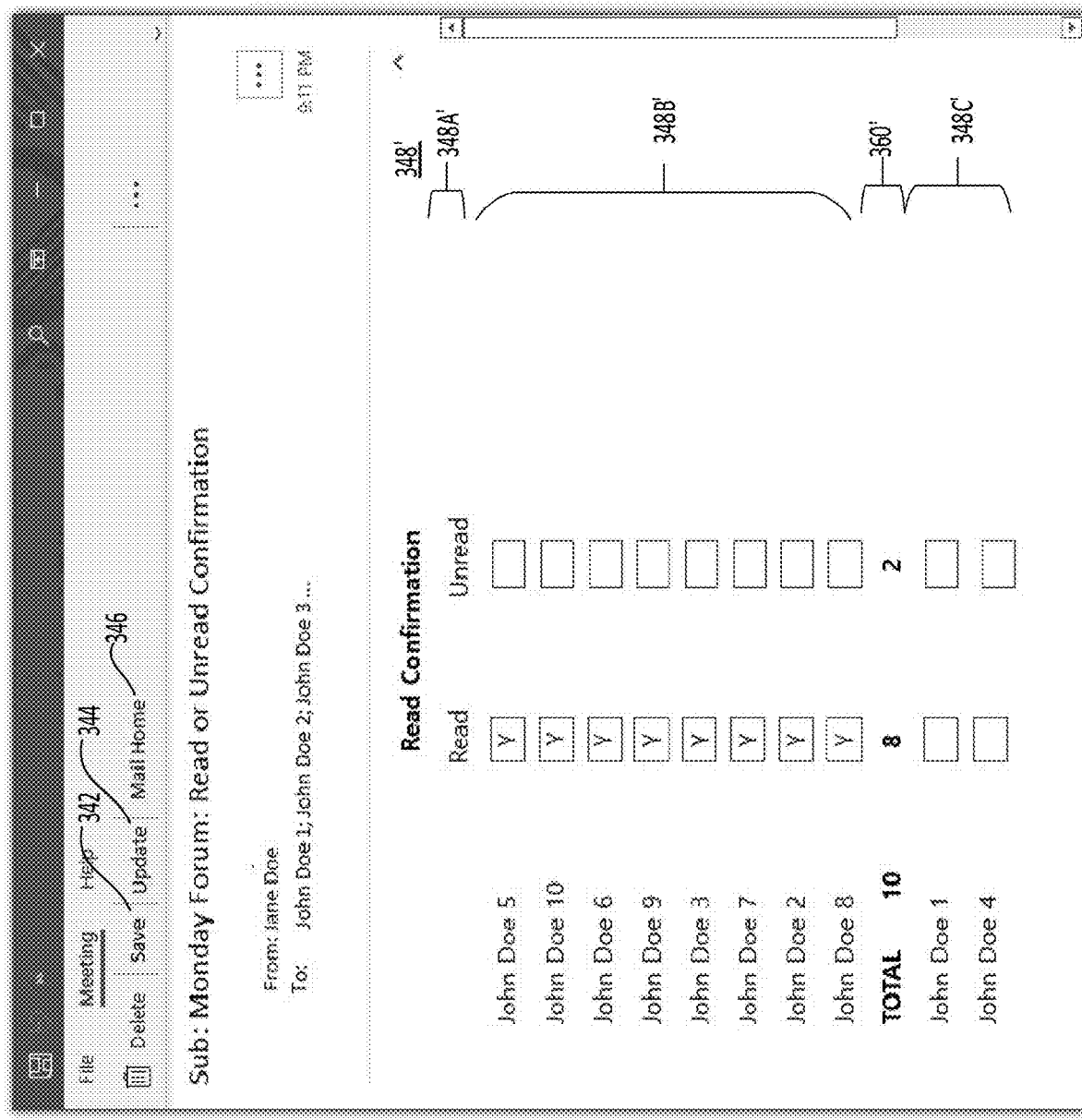
Figure 6:
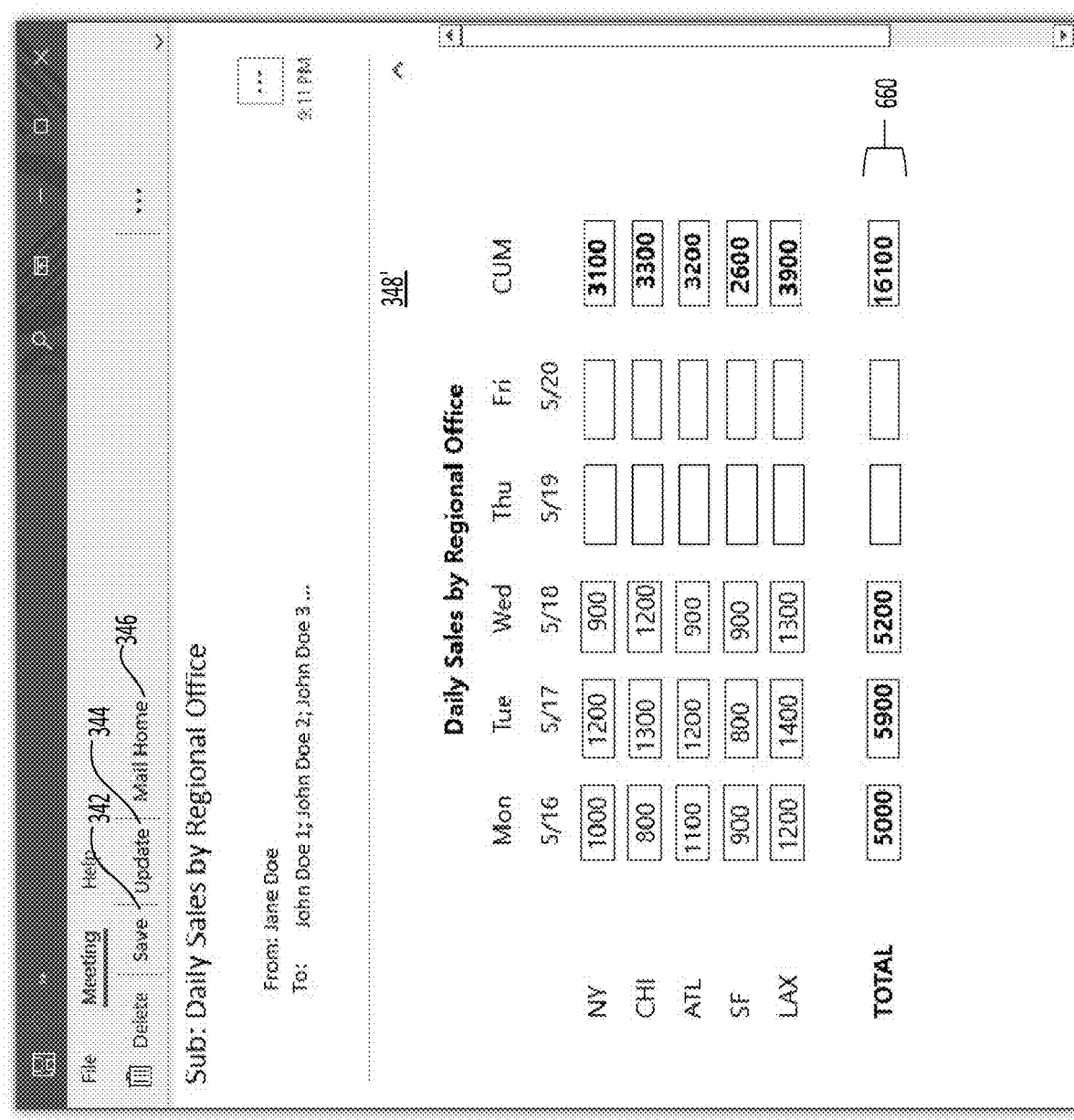
Figure 7:
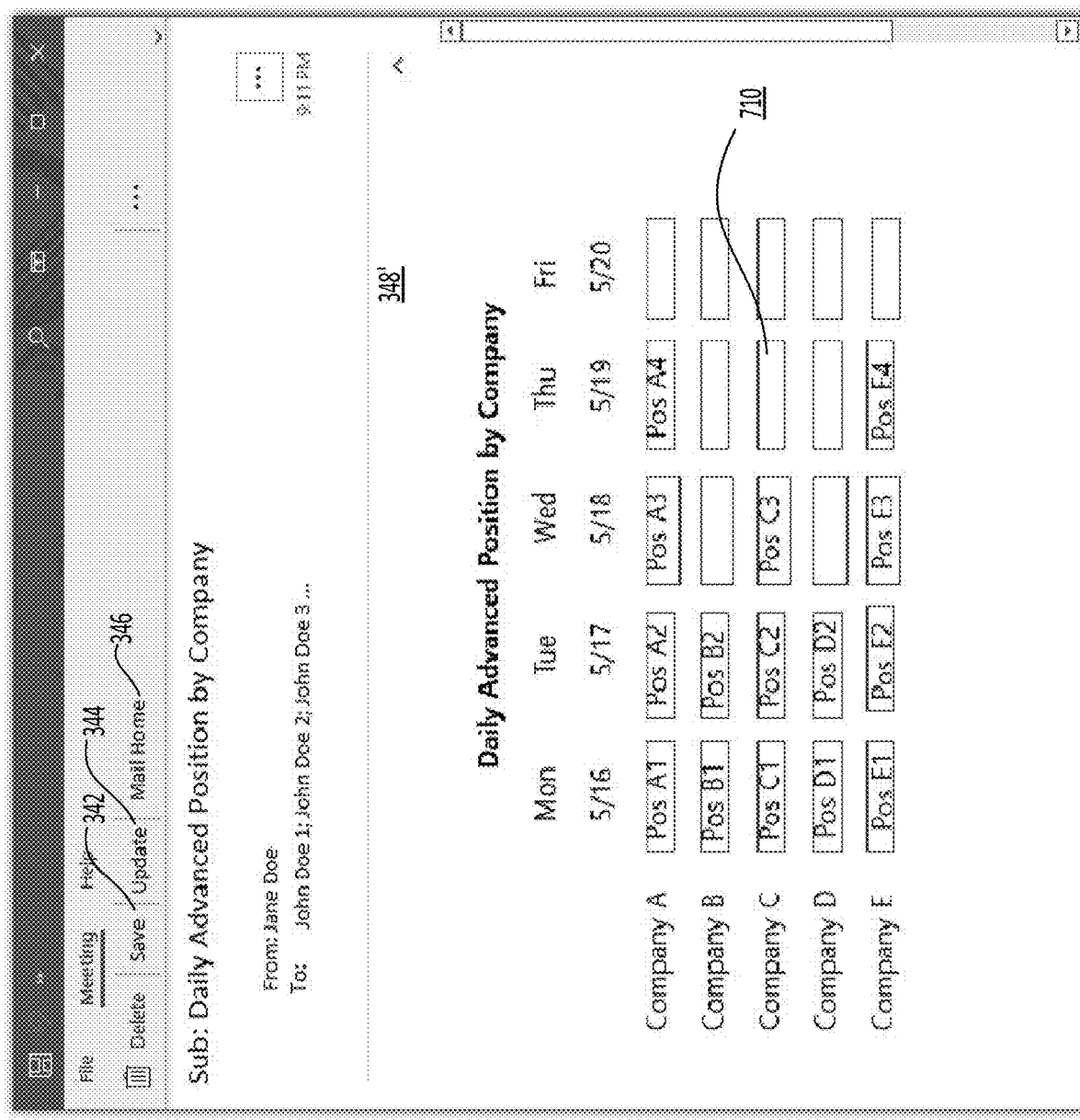

FIGS. 5-7 illustrate other embodiments of EAR Tracking GUIs. In particular, FIG. 5 illustrates a read/unread confirmation/acknowledgement screen 500. At any time, the "Read" or "Unread" information (e.g., read receipts) may be shown. In addition, a read timestamp (e.g., like in FIG. 4B).

FIG. 6 shows numerical values in the reply data table 348' of an EAR Tracking GUI 600. The numerical values may include 2-dimensional grid including various data (e.g., Place, Time, Sales), which can easily be tabulated in the row 660. Note the row 660 is a total row but it is not a tally (e.g., one count for each response) but rather adds each of the values together. The GUI 600 of FIG. 6 may be used everyday by a branch manager to input daily sales volume. Other numerical values may be used according to embodiments, such as Sales, Production, Ordered, Delivered, Finished, Paid, Deposited, etc. as well as week to date (WTD), month to date (MTD), and/or Year to Date (YTD) can easily be processed.

FIG. 7 shows coded value data in the reply data table 348' of an EAR Tracking GUI 700. For example, as shown in GUI 700, Company A and E have finished Position (Pos) A4 and E4, respectively, but Company C has not yet finished Pos C4 yet. If Company C was expected to finish position 4 (e.g., C4), then the Company C box for Thu May 19 may indicate it is unfinished (e.g., with highlighting or bolding of the box 710).

Data Types

According to embodiments, multiple data types may be used for the reply table data 348'. For example, character types (e.g., Y, N, U, W, etc.), numerical types (e.g., 1, 2, 1000, 2500 etc.), pre-coded value types (Pos A1, Pos B5, Pos D5 etc.).

According to embodiments, the reply table data 348' can handle any type of data. The reply table database system can create some of its own new data elements such as a percentage (%), Total or Cum Total, etc. for effective analysis of the reply data (Total is shown in the previous GUIs but these other values may be used).

The reply table data can be developed into a DBMS (Data Base Management System), i.e., a Relational DBMS such as Oracle or SQL for easy access and in-depth analysis.

According to embodiments, the email message and/or the augmented email may include a basic Internet email format (RFC5322), including a "Contents" of Conventional Email Messages consist of two sections, "Header" and "Body". The Header is structured into a number of Fields. Each Field has a name, Field name, followed by the separator character ":", and a value. Each Field name begins in the first character of a new line. A Sender, as the Author of email, has to input the value for each Field selected ("From:", "To:", "CC:", "BCC:", "Date:", "Subject:", etc.). The Body contains the message, as a plain Text or HTML, and sometimes with a Signature Block. The Header is separated from the Body by a Blank Line. A Sender has to input the Body contents. According to embodiments, a Receiver has to choose one of many Field Options: "Reply", "Reply" or "Reply All" or "Forward"

Creating an EAR Tracking GUI with Reply Table Database

Figure 8:
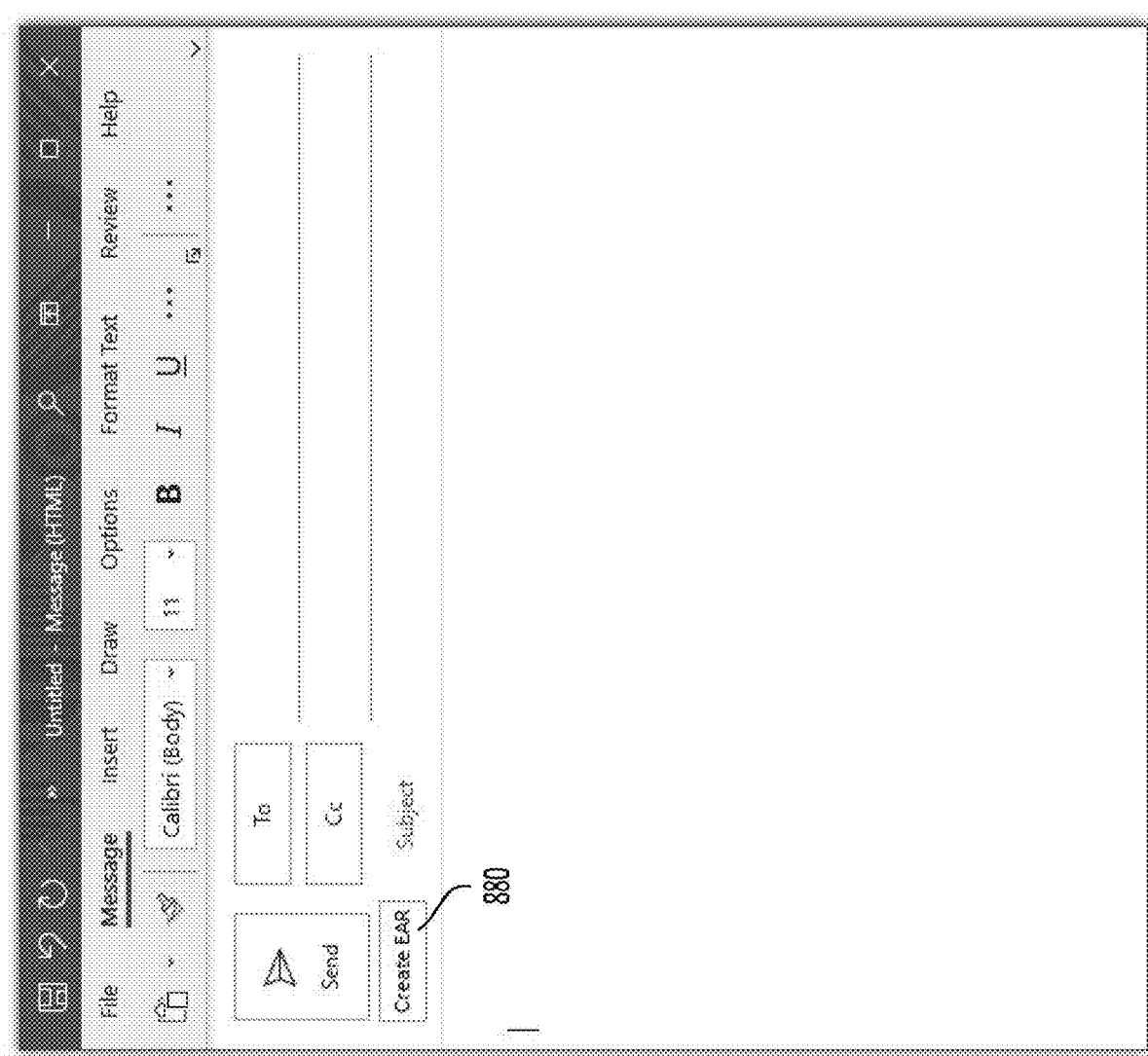
FIG. 8 illustrates an electronic display device's display of example of an email GUI with a create button, according to certain embodiment.

According to an embodiment, an email author may create an EAR Tracking GUI. First, the email author/email sender may make a conventional original email on a Home Email Screen. On the sender's home email screen there may be a Create EAR button 880 as shown in FIG. 8. Only on the sender's home email screen, will there be a Create EAR button 880, according to certain embodiments. The Create EAR button 880 is for creating a new EAR Tracking GUI. The sender may also enter all the field values in the header portion, which may be identical to that of original convention Home mail, i.e., Fr To CC Bcc Sub etc. Additionally, the sender will have to create a 2-Dimensional EAR table. Note that the Reply Table is constructed of three parts: a EAR title, an EAR member list, and an EAR column header (e.g., a checkbox column header). The title may correspond to a subject or title input into the email service provider (ESP) email application GUI (e.g., as shown in FIG. 8). The ESP may ask a sender to input the EAR title. For example, the title may be "Monday Forum: Participation March 20", "World Tour: First 6 Persons Tour", "Birdie Golf: First 4 Players on May 2021 10:30 am", "Read Confirmation", "Daily Sales by Regional Office", "Daily Advanced Position by Company".

The EAR member list may correspond to the email addressee/receiver list in the "TO:" field of the Original Home Email, which will automatically become the Member List of the Reply Table. The Receiver List in the "CC:" and "BCC:" may not be included in the Member List of the Reply Table. The CC: and BCC: email addressee may be allowed to access and read only the Reply Table data but not modify it themselves.

The ESP may provide many options for CHECKBOX COLUMN HEADERS and Sender has to choose ONE out of many options. For example, the Reply Table CHECKBOX COLUMN HEADER Options may include: Option 1 (Yes, No, Undecided and No Answer), Option 2 (Yes, Waiting, No, Undecided, No Answer), Option 3 (Yes, Waiting, No, Undecided, Reply Time, No Ans), Option 4 (Read, Unread), Option 5 (Mon May 2016, Tue May 2017, Wed May 2018, Thu May 2019, Fri May 2020), Option 6 (Mon, Tue, Wed, Thu, Fri, CUM (Cumulative Total)). The options may be presented to the user in a sub screen where the user selects which option to generate the EAR table.

In real world operations, a User (Sender) can submit his/her own unique CHECKBOX COLUMN HEADER to ESP for his/her own use and save it for later use again.

According to an embodiment, binary type answers, "Yes" or "No", can be applied to many other situations such as, "Agree" or "Disagree", "Like" or "Dislike" and "Recommend" or "Not Recommend", etc.

According to an embodiment, the EAR Tracking GUI may be active or inactive. When an EAR Tracking GUI has been started to be made, but not has to be finished yet, then it is in "Inactive" Status. It is still in the process of being made. When an EAR Tracking GUI screen has been finished to be made, then it is in "Active" Status. An Inactive Status can be changed to Active Status via an activate button, which may be displayed next to or in place of the button 880 of FIG. 8.

If three components of the EAR Reply Table Data Base, Title, Checkbox Column Header, and Member List of are all registered in the EAR Screen, then the initial EAR Screen is ready to be Activated and becomes an Active Mail/Screen. Once Activated, the Reply Table can be analyzed, updated, retrieved, displayed, edited, and deleted. "Edit", "Delete", "List" of all EAR mails, etc. can be performed. In addition, continuous update may be performed. For example, whenever a save Button is clicked on an EAR Tracking GUI, the current Reply Data (e.g., user input) are sent to the TS, and the Reply Table Data Base will be automatically updated.

Whenever an update button is clicked, the current, most up-to-date Reply Table Data will be retrieved from the TS and displayed on the EAR Tracking GUI.

According to an embodiment, a Comment Window can be made for all the participants, Sender, and all Receivers, to participate in the common discussion. For example, a Comment Button 347 (shown in GUI 340G of FIG. 3H) can be provided in the EAR Tracking GUI to provide an entry field for comments.

In addition, there may be connection to external systems. For example, Spread Sheet Connections, such as Microsoft Excel, Google Sheets, Numbers may display the reply table data. The Reply Table Data can be exported and connected to some external Spread Sheet Applications such as Microsoft Excel, Google Sheets, Apple Numbers etc. Also, independently developed MIS (Management Information System) can easily be connected for analyses and distribution.

In addition, Short Message System (SMS)/Multimedia Message System (MMS) and/or Mobile Message System may be used. For example, the system may be integrated with a current message system on cellphones. The Message Service Provider (MSP) may be T-Mobile, AT&T, Verizon, Sprint etc., The SMS may include text characters up to 160 characters per message. The MIMS may include text, audio, video, emojis and weblink messages that can be sent and received.

The Message System may be operated on Cellular Network (or Mobile Telecommunication Network) and NOT on Internet. Thus, FIG. 1A may be modified to use a different network communication instead of the Internet.

A mobile message EAR Tracking system can be used with exactly the same concept and technology of the email EAR Tracking system/GUIs discussed above. The TS may be a Message Response Tracking Server connected directly to a Message Server (instead of an Email Server) and Internet which is connected to Mobile Cellular Network. In addition, RCS (Rich Communication Services) may be used instead of SMS and MMS. RCS may include Text, Audio, Photos, Video possible on Cellular Network and Wi-Fi.

In addition, an Instant Messenger System may be used. For example, an Instant Messenger System Provider (IMSP), such as WhatsApp, WeChat, Facebook, Skype, and/or iMessage. The IMSP may be operated on the Internet (while SMS/MMS is on Cellular Network). An app may need to be downloaded to a dedicated Internet system. Real-Time (hence "Instant") Chat or Group messaging is possible, which may not be possible on email. Text, Audio, Photo, Video data transfers may be performed among closed loop Users (Buddy List or Friend List). For example, an Instant Messenger Tracking System may be exactly the same concept and technology of the EAR Tracking System but to IM instead of Email, and be connected directly to Instant Messenger Server and Internet.

For example, a smartphone may be used with SMS/MMS, RCS, and IM Systems on a Cellular Network (e.g., SMS/MMS/RCS) or the Internet (IM System, WhatsApp, WeChat, Facebook, Skype).

According to an embodiment, various abbreviations are used: Home Message: HM; Y: Yes; W: Waiting; N: NO; U: Undecided; Comments: CO; NA: No Answer.

According to an embodiment, scrolling, both vertical and horizontal, can be used in the EAR Tracking GUIs. Although EAR stands for email addressee response, the concepts may work on any type of Networks, i.e., Internet, Mobile Networks, or any other type of Networks.

The replies/answers can be in forms of: Binary (Y/N type), Numeric, Time and Character Type etc. The data may be analyzed, sorted, and displayed in the EAR Tracking GUIs.

According to an embodiment, any Receiver or Sender can send and receive Info directly to and from the TS (Tracking Server). The Tracking Server does not have to be physically separated from the Email Server. Both Servers can be in a same computer at a separated, different area.

While explaining components of the system and/or the GUIs according to embodiments of the disclosure, a detailed description of the contents overlapping with the system(s) and/or GUIs according to the embodiments will be omitted.

Overlapping elements are not repeated and may correspond to previously described elements having a same or similar name. While explaining the GUIs according to embodiments of the disclosure, a detailed description of the contents overlapping with the GUIs according to the embodiments will be omitted.

Although exemplary embodiments have been shown and described, the disclosure is not limited thereto, and various modifications and variations are possible within the scope of the appended drawings and the detailed description. It will be appreciated by those skilled in the art that changes may be made in these exemplary embodiments without departing from the principles and spirit of the general inventive concept, the scope of which is defined in the appended claims and their equivalents.

The invention claimed is:

1. A responsive server system method performed by one or more hardware servers, the responsive server method comprising:
 receiving, from a sending electronic terminal device, an email addressed to at least two email addressees;
 in response to receiving the email from the sending electronic terminal device:
  accessing, by the one or more hardware servers, a status update link stored in a database;
  generating an augmented email including the status update link and the received email; and
  transmitting, over a network, the generated augmented email having the status update link to respective electronic devices of each of the at least two email addressees;
 receiving an indication of a user interaction with the status update link;
 in response to receiving the indication of the user interaction with the status update link: accessing email addressee response graphical user interface (GUI) information, the email addressee response GUI information including a displayable response results GUI displaying the at least two email addressees of the email addressed to the at least two email addressees, wherein the response results GUI displays first identifying information corresponding to a first email addressee of the at least two email addressees and second identifying information corresponding to a second email addressee of the at least two email addressees, wherein the displayable response results GUI further displays response information adjacent to the second identifying information, wherein the first email addressee corresponds to a user who performed the user interaction, and the second email addressee corresponds to another user different than the user who performed the user interaction;
 transmitting, over the network, the email addressee response GUI information;
 receiving real time user input submitted in the displayable response results GUI included with the email addressee response GUI information;
 in response to receiving the real time user input submitted in the displayable response results GUI:
  storing the real time user input in the database in association with the first email addressee;
  updating the displayable response results GUI to display the real time user input adjacent to the first email addressee;
  identifying whether the real time user input is a first response type or a second response type;
  when the real time user input is the first response type, updating a displayed or stored first type summary value in real time; and
  when the user input is the second response type, updating a displayed or stored second type summary value in real time, wherein each of the first type summary value and the second type summary value correspond to a summarization of the first response type and the second response type, respectively.

2. The responsive server system method of claim 1, wherein displaying of the response results GUI includes displaying the real time user input, the first type summary value and the second type summary value in a two-dimensional grid shaped format.

3. The responsive server system method of claim 2, wherein the response results GUI displays an indication of response status of each addressee that has responded.

4. The responsive server system method of claim 3, wherein the summarization of the responses includes a total number of the respective response type or an average value of the response type.

5. The responsive server system method of claim 2, further comprising exporting a reply table data corresponding to the two-dimensional grid shaped form into a spreadsheet form that is compatible with a spreadsheet application.

6. The responsive server system method of claim 1, wherein the accessing of the email addressee response GUI information includes: identifying an email addressee of the email; and generating the email addressee response GUI information where the email addressee response GUI displays one or more editable user input fields in the two-dimensional grid shaped format on a row corresponding to the first email addressee.

7. The responsive server system method of claim 1, wherein the email addressee response GUI is configured to receive user input by the addressee of the email message only.

8. The responsive server system method of claim 1, wherein the email addressed to at least two email addressees is a meeting, appointment, or event invitation.

9. The responsive server system method of claim 1, wherein
 the one or more hardware servers includes an email server and an email addressee tracking server, and
 the responsive server system method further comprises:
  in response to receiving the email from the sending electronic terminal device:
   transmitting, by the email server, the email to the email addressee tracking server;
   accessing, by the email addressee tracking server, a status update link stored in a database of the email addressee tracking server;
   generating, by the email addressee tracking server, the augmented email having the status update link included with the received email;
   transmitting, by the email addressee tracking server to the email server, the generated augmented email having the status update link; and
   transmitting, over the network by the email server, the augmented email having the status update link to respective electronic devices of the at least two email addressees.

10. The responsive server system method of claim 1, wherein the user interaction corresponds to selecting, tapping, or clicking a button.

11. The responsive server system method of claim 1, wherein the status update link corresponds to a hyperlinked Uniform Resource Locator (URL).

12. The responsive server system method of claim 1, wherein the first type summary value and the second type summary value are updated by adding, subtracting, accumulating, or averaging.

13. The responsive server system method of claim 1, wherein the first type summary value is a first accumulated value that corresponds to a first type of response of one of: "Yes", "Wait", "No", or "Undecided", or "No Answer", the second type summary value is a second accumulated value that corresponds to a second type of response of a different one of: "Yes", "Wait", "No", or "Undecided", or "No Answer",
   the email addressed to the at least two email addressees is a meeting or appointment request, and
   the first type of response is different than the second type of response.

14. The responsive server system method of claim 1, wherein the response results GUI automatically updates an email addressee's displayed status from a wait status to a yes status when a different email addressee of the at least two email addressees changes a yes status to a different status.

15. The responsive server system method of claim 1, wherein the response results GUI includes timestamp information corresponding to when a specific response was entered.

16. A responsive server system comprising:
   a network communication interface;
   a memory; and
   processing circuitry, wherein the processing circuitry is configured to execute computer-executable instructions stored in the memory to perform the following operations:
      receiving, from a sending electronic terminal device, an email addressed to at least two email addressees;
      in response to receiving the email from the sending electronic terminal device:
         accessing a status update link stored in a database;
         generating an augmented email including the status update link and the received email; and
         transmitting, over a network, the generated augmented email having the status update link to respective electronic devices of each of the at least two email addressees;
      receiving an indication of a user interaction with the status update link;
      in response to receiving the indication of the user interaction with the status update link: accessing email addressee response graphical user interface (GUI) information, the email addressee response GUI information including a displayable response results GUI displaying the at least two email addressees of the email addressed to the at least two email addressees, wherein the response results GUI displays first identifying information corresponding to a first email addressee of the at least two email addressees and second identifying information corresponding to a second email addressee of the at least two email addressees, wherein the displayable response results GUI further displays response information adjacent to the second identifying information, wherein the first email addressee corresponds to a user who performed the user interaction, and the second email addressee corresponds to another user different than the user who performed the user interaction;
      transmitting, over the network using the network communication interface, the email addressee response GUI information;
      receiving real time user input submitted in the displayable response results GUI included with the email addressee response GUI information;
      in response to receiving the real time user input submitted in the displayable response results GUI: storing the real time user input in the database in association with the first email addressee;
      updating the displayable response results GUI to display the real time user input adjacent to the first email addressee;
      identifying whether the real time user input is a first response type or a second response type;
      when the real time user input is the first response type, updating a displayed or stored first type summary value in real time; and
      when the real time user input is the second response type, updating a displayed or stored second type summary value in real time, wherein each of the first type summary value and the second type summary value correspond to a summarization of the first response type and the second response type, respectively.

17. The responsive server system of claim 16, wherein displaying of the response results GUI includes displaying the real time user input, the first type summary value and the second type summary value in a two-dimensional grid shaped format.

18. The responsive server system of claim 17, wherein the response results GUI displays an indication of response status of each addressee that has responded.

19. The non-transitory computer-readable medium of claim 16, wherein displaying of the response results GUI includes displaying the real time user input, the first type summary value and the second type summary value in a two-dimensional grid shaped format.

20. A non-transitory computer-readable medium comprising computer-executable instructions that, when executed by processing circuitry, cause the processing circuitry to perform the following operations:
   receiving, from a sending electronic terminal device, an email addressed to at least two email addressees;
   in response to receiving the email from the sending electronic terminal device:
      accessing a status update link stored in a database;
      generating an augmented email including the status update link and the received email; and
      transmitting, over a network, the generated augmented email having the status update link to respective electronic devices of each of the at least two email addressees;
   receiving an indication of a user interaction with the status update link;
   in response to receiving the indication of the user interaction with the status update link: accessing email addressee response graphical user interface (GUI) information, the email addressee response GUI information including a displayable response results GUI displaying the at least two email addressees of the email addressed to the at least two email addressees, wherein the response results GUI displays first identifying information corresponding to a first email addressee of the at least two email addressees and second identifying information corresponding to a second email addressee of the at least two email addressees, wherein the displayable response results GUI further displays response information adjacent to the second identifying information, wherein the first email addressee corresponds to a user who performed the user interaction, and the second email addressee corresponds to another user different than the user who performed the user interaction;

transmitting, over a network using the network communication interface, the email addressee response GUI information;

receiving real time user input submitted in the displayable response results GUI included with the email addressee response GUI information;

in response to receiving the real time user input submitted in the displayable response results GUI: storing the real time user input in the database in association with the first email addressee;

updating the displayable response results GUI to display the real time user input adjacent to the first email addressee;

identifying whether the real time user input is a first response type or a second response type;

when the real time user input is the first response type, updating a displayed or stored first type summary value in real time; and when the real time user input is the second response type, updating a displayed or stored second type summary value in real time, wherein each of the first type summary value and the second type summary value correspond to a summarization of the first response type and the second response type, respectively.

\* \* \* \* \*